US012730683B2

(12) United States Patent
Krasilnikov et al.

(10) Patent No.: US 12,730,683 B2

(45) Date of Patent: Sep. 8, 2026

(54) CUSTOMER-INITIATED VIRTUAL MACHINE RESOURCE ALLOCATION SHARING

(71) Applicant: Amazon Technologies, Inc., Seattle, WA (US)

(72) Inventors: Nikolay Krasilnikov, Seattle, WA (US); Benjamin Wojtowicz, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 737 days.

(21) Appl. No.: 17/958,084

(22) Filed: Sep. 30, 2022

(65) Prior Publication Data

US 2024/0111603 A1 Apr. 4, 2024

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/4557* (2013.01); *G06F 2009/45595* (2013.01)

(58) Field of Classification Search
CPC ..................................................... G06F 9/5077
USPC ............................................................. 718/1
See application file for complete search history.

(56) References Cited

U.S. PATENT DOCUMENTS 8,615,579 B1 * 12/2013 Vincent ................ G06F 9/5094 709/224
9,389,893 B2 * 7/2016 Raghu ................ G06F 9/45558
9,471,385 B1 * 10/2016 Khafizov ........... G06F 9/45533
10,469,512 B1 * 11/2019 Ismael .................. G06F 9/5011
10,684,894 B2 * 6/2020 Quinn ................. G06F 9/45558
11,025,483 B1 * 6/2021 Hashmi ................. H04L 63/164
11,036,537 B1 * 6/2021 Quinn ................. G06F 9/45558
11,281,486 B2 * 3/2022 Barabash ................ H04L 47/10
11,500,663 B1 * 11/2022 Gupta ....................... G06F 8/63
2008/0184227 A1 * 7/2008 Matsumoto ........... G06F 9/5077 718/1
2011/0145833 A1 * 6/2011 De Los Reyes ...... G06F 9/5077 726/17

(Continued)

OTHER PUBLICATIONS

International Search Report and Written Opinion, PCT App. No. PCT/US2023/075089, Jan. 31, 2024, 12 pages.

(Continued)

*Primary Examiner* — Mehran Kamran

(74) *Attorney, Agent, or Firm* — Nicholson DeVos Webster & Elliott LLP

(57) ABSTRACT

Techniques for customer-initiated virtual machine resource allocation sharing are described. A hardware virtualization service of a cloud provider network receives a request to launch a first virtual machine, wherein the first virtual machine is of a first virtual machine type, the first virtual machine type having a resource amount allocated to virtual machines of the first virtual machine type. The hardware virtualization service causes a launch of the first virtual machine on a host computer system of the cloud provider network. The host computer system shares an allocation of the resource amount from a corresponding resource of the host computer system between the first virtual machine and a second virtual machine, wherein the second virtual machine is of the first virtual machine type.

20 Claims, 14 Drawing Sheets

(56) References Cited

U.S. PATENT DOCUMENTS

2012/0272237 A1 10/2012 Baron
2013/0179881 A1* 7/2013 Calder .................. G06F 9/5072 718/1
2013/0219066 A1* 8/2013 Arroyo ................. G06F 9/5077 709/226
2014/0040474 A1* 2/2014 Blagodurov .......... G06F 9/5094 709/226
2014/0082165 A1* 3/2014 Marr ..................... G06F 9/5044 709/222
2014/0082614 A1* 3/2014 Klein .................... G06F 9/5088 718/1
2014/0164618 A1* 6/2014 Alicherry .............. G06F 9/5072 709/226
2014/0222889 A1* 8/2014 Bello ...................... H04L 47/76 709/202
2014/0321459 A1* 10/2014 Kumar ................ H04L 47/2425 370/360
2015/0095597 A1* 4/2015 Ayanam .................. G06F 3/065 711/162
2015/0106805 A1* 4/2015 Melander .............. G06F 9/5077 718/1
2015/0281059 A1* 10/2015 Xiao .................. G06F 9/45558 709/238
2016/0128077 A1* 5/2016 Tsirkin .................... H04L 47/24 370/392
2016/0378532 A1* 12/2016 Vincent ................. G06F 9/5088 718/1
2017/0285730 A1* 10/2017 Min ...................... G06F 9/5083
2018/0210764 A1* 7/2018 Greeff ........................ G06F 9/46
2018/0253361 A1* 9/2018 Dhatrak .............. G06F 11/3034
2018/0288167 A1* 10/2018 Dutta ...................... H04L 67/61
2019/0042347 A1* 2/2019 Boenisch ............ G06F 11/1441
2019/0146850 A1* 5/2019 Quinn ................... H04L 41/082 709/226
2019/0366208 A1* 12/2019 Peitzer .................. A63F 13/332
2021/0044540 A1* 2/2021 Rushton .................. G06F 9/505
2023/0101776 A1* 3/2023 Beveridge ............. G06F 9/4401 718/1
2024/0111603 A1* 4/2024 Krasilnikov ........ G06F 9/45558

OTHER PUBLICATIONS

International Search Report on Patentability, PCT App. No. PCT/US2023/075089, Apr. 10, 2025, 10 pages.
Office Action, EP App. No. 23793206.6, Sep. 12, 2025, 06 pages.

* cited by examiner

OPERATIONS
1100

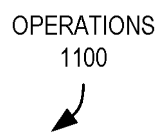

RECEIVING, BY A HARDWARE VIRTUALIZATION SERVICE OF A CLOUD PROVIDER NETWORK, A REQUEST TO LAUNCH A FIRST VIRTUAL MACHINE, WHEREIN THE FIRST VIRTUAL MACHINE IS OF A FIRST VIRTUAL MACHINE TYPE, THE FIRST VIRTUAL MACHINE TYPE HAVING A RESOURCE AMOUNT ALLOCATED TO VIRTUAL MACHINES OF THE FIRST VIRTUAL MACHINE TYPE
1102

CAUSING, BY THE HARDWARE VIRTUALIZATION SERVICE, A LAUNCH OF THE FIRST VIRTUAL MACHINE ON A HOST COMPUTER SYSTEM OF THE CLOUD PROVIDER NETWORK
1104

SHARING, BY THE HOST COMPUTER SYSTEM, AN ALLOCATION OF THE RESOURCE AMOUNT FROM A CORRESPONDING RESOURCE OF THE HOST COMPUTER SYSTEM BETWEEN THE FIRST VIRTUAL MACHINE AND A SECOND VIRTUAL MACHINE, WHEREIN THE SECOND VIRTUAL MACHINE IS OF THE FIRST VIRTUAL MACHINE TYPE
1106

*FIG. 11*

CUSTOMER-INITIATED VIRTUAL MACHINE RESOURCE ALLOCATION SHARING

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various examples in accordance with the present disclosure will be described with reference to the drawings.

FIG. 11 illustrates operations of a method for customer-initiated virtual machine resource allocation sharing according to some examples.

DETAILED DESCRIPTION

Figure 1:
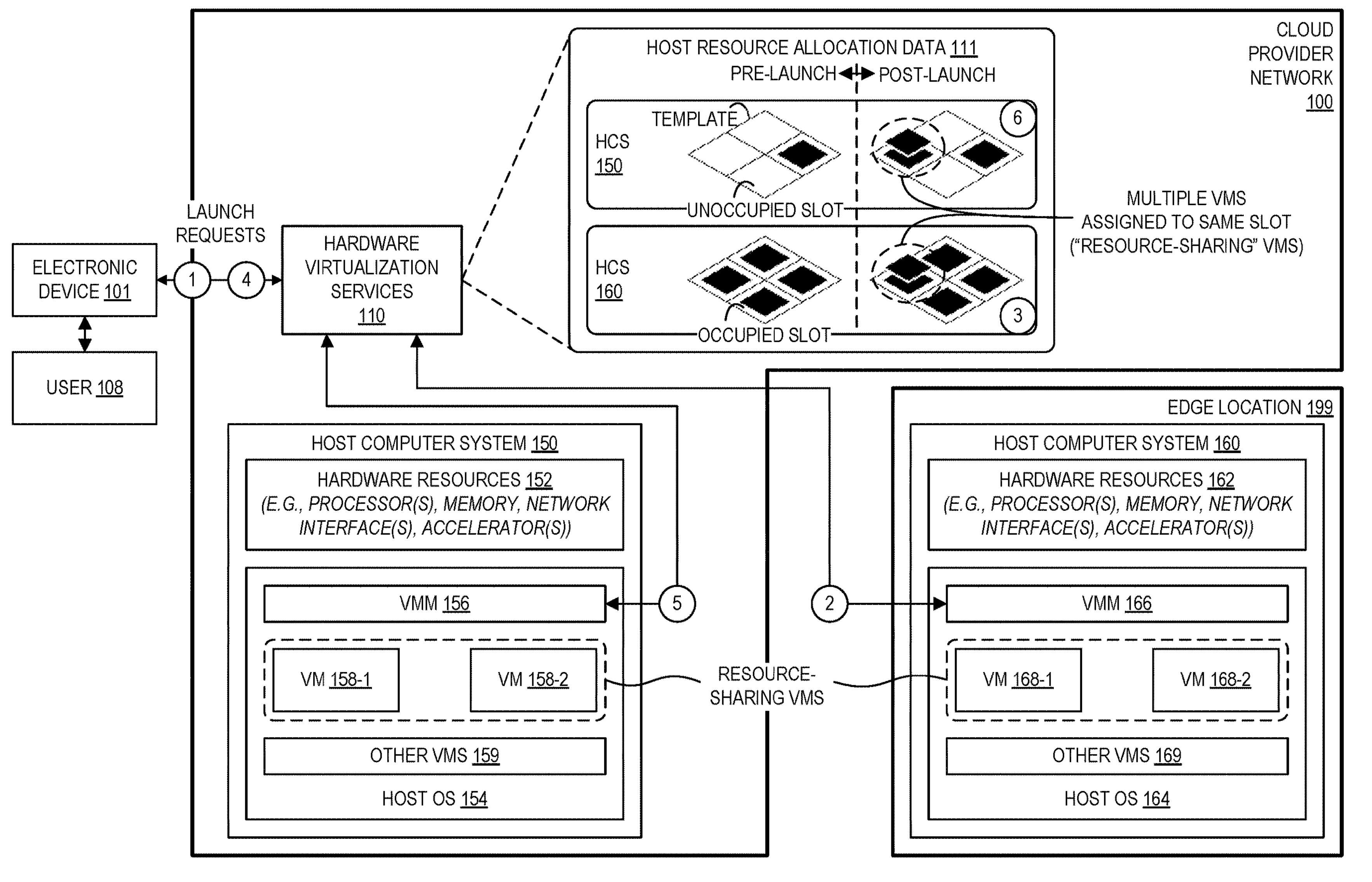
FIG. 1 illustrates an environment for customer-initiated virtual machine resource allocation sharing according to some examples.

The present disclosure relates to methods, apparatus, systems, and non-transitory computer-readable storage media for customer-initiated virtual machine resource allocation sharing. More specifically, embodiments of the present disclosure relate to "single slot oversubscription" in which a customer can request to have duplicate copies of an instance run on the same "slot." A slot refers to a set of physical hardware resources (e.g., CPU, memory) that is allocated for use by a particular virtual machine instance (VM), or in the case of the present disclosure, to the VM and its copy. The duplicate VMs may be a running VM and a standby copy of that VM, or may be a running VM and an updated version of that VM which can be swapped out for the older version of the VM when ready. The disclosed techniques for customer-initiated slot oversubscription for a standby VM copy beneficially enable the customer's application to failover to the standby VM in the scenario that the running copy of the VM encounters a problem, without requiring the use of two separate slots for the running copy and the standby copy. This can be particularly beneficial for workloads running on edge servers that have more limited capacity, to be able to make efficient use of the limited capacity while also preventing downtime or outages of the customer's application that would otherwise result from the time taken to reprovision the VM from scratch.

Cloud provider networks offer a variety of computing products and services to their customers. Virtualization technologies are an important foundation to these offerings—providing customers access to their own virtualized computing environment while the underlying hardware resources supporting the virtualized computing environment are typically shared amongst many virtualized computing environments. Since virtualization decouples the relationship between physical hardware and virtualized computing environments, virtual machines are often described by an amount and/or a performance level of different resources (e.g., compute, memory, network throughput, storage, accelerators, etc.) that they can use (or use up to) from the underlying host computer system. Virtual machines, also referred to as VMs or instances, with different resource allocations may be referred to as different virtual machine types. For example, one virtual machine type might have two virtual processors, 8 gigabytes of memory, 10 gigabits/second network throughput, while another virtual machine type might have four virtual processors, 16 gigabytes of memory, 15 gigabits/second network throughput, and an attached accelerator card (e.g., a graphics processor, a signal processor, etc.).

While the resources of a host computer system (or just "host") might be shared amongst many different virtual machines, the resources allocated to a particular virtual machine are typically dedicated to that virtual machine. Examples described herein relate to the customer-initiated sharing of the resources allocated to a particular virtual machine amongst multiple virtual machines. Each of the virtual machines sharing an underlying virtual machine resource allocation are referred to as "resource-sharing" virtual machines. Sharing may also be referred to as "oversubscription" because the advertised amount and/or performance level associated with the virtual machine type reflects the aggregate amount and/or performance level available to each of the resource-sharing virtual machines.

In some examples, a customer can request the launch of one or more resource-sharing virtual machines from a virtualization service of the cloud provider network by identifying an existing virtual machine with which the newly requested virtual machine(s) will share resources. In such a case, the virtualization service can launch the requested virtual machine on the same host executing the existing virtual machine and configure the host to share the resource allocation of the existing virtual machine with the newly launched virtual machine. In other examples, the customer can request the launch of multiple resource-sharing virtual machines of a particular type. In such cases, the virtualization service can launch the virtual machines on a host and configure the host to share a resource allocation typically associated with a single virtual machine of that type amongst the virtual machines. In either case, the resources traditionally allocated to a single virtual machine of a given type would then be shared amongst multiple resource-sharing virtual machines of that type. Of course, if all but one of the resource-sharing virtual machines are terminated, the remaining virtual machine will no longer be resource-sharing and have the full allocated amount and/or performance level of the virtual machine available to it.

Permitting the sharing of a resource allocation for one virtual machine amongst virtual machines can be advantageous in many situations. For example, some customers might periodically update their applications using a rolling deployment strategy. Under a rolling deployment strategy, virtual machines running an older version of a customer application are slowly replaced with virtual machines running a newer version of the customer application. Rather than launch a virtual machine requiring a separate resource allocation, customers can launch a resource-sharing virtual machine alongside the existing virtual machine executing the older version of the application. Once the virtual machine executing the newer version of the application is running, the virtual machine executing the older version of the application can be terminated.

As another example of an advantageous use for resource sharing virtual machines, some customers may want to have a backup virtual machine ready in the event of a failure of a primary virtual machine. Such a backup may be referred to as a "shadow" virtual machine. While the primary virtual machine operates normally, the backup virtual machine likely consumes very little resources. Doing so can eliminate the cost associated with a second virtual machine having a separate resource allocation while also reducing downtime in the event of a failure (e.g., due to delays that may arise when re-routing network traffic from the primary virtual machine to the backup virtual machine if hosted on another host).

The advantages of the resource-sharing virtual machines are further amplified in the context of cloud provider network edge locations. For present purposes, edge locations typically extend the managed infrastructure experience normally associated with the cloud provider network into other environments (e.g., third-party networks, customer networks, etc.). Since they are deployed beyond the typical bounds of the cloud provider network, edge locations have relatively limited physical computing resources available for virtualized customer environments and other services as compared to the cloud. Given their smaller resource capacity relative to the cloud, an edge location may simply lack sufficient available resources to allocate to a new, parallel virtual machine launch for fail-over, deployment, or other purposes. Consequently, a customer may need to terminate an existing virtual machine before launching its replacement, which can lead to significant downtime for the customer's application. That downtime can be exacerbated if any dependencies need to be transferred from the cloud provider network to the edge location prior to launching the new virtual machine where the communications channel between the cloud provider network and edge locations is limited. Resource-sharing virtual machines can thus play an important role in minimizing downtime where physical compute resources may be limited.

As an example use case, the disclosed single-slot oversubscription techniques may be implemented on a radio access network (RAN) edge server running network functions corresponding to a distributed unit (DU) and/or centralized unit (CU) of a wireless communication network such as a 5G network. The RAN also includes a radio unit (RU) and one or more antennae. These units can be geographically distributed and provided in different ratios to one another, however typically at least the RU will be located close to the antenna(e). Multiple RUs may connect to a DU, and multiple DUs may connect to a CU. The CU(s) of a 5G network may be remote from the antennae in a more centralized location. Collectively, the radio unit (RU), distributed unit (DU), and central unit (CU) convert the analog radio signal received from the antenna into a digital packet that can be routed over a network, and similarly they convert digital packets into radio signals that can be transmitted by the antenna. This signal transformation is accomplished by a sequence of network functions which can be distributed amongst the RU, DU, and CU in various ways to achieve different balances of latency, throughput, and network performance. These are referred to as "functional splits" of the RAN.

The network functions implemented in the RAN correspond to the lowest three network layers in the seven layer OSI model of computer networking. The physical Layer, PHY, or layer 1 (L1) is the first and lowest layer in the OSI model. In a radio-based network 103, the PHY is the layer that sends and receives radio signals. This can be split into two portions: a "high PHY" and "low PHY." Each of these can be considered a network function. The high PHY converts binary bits into electrical pulses that represent the binary data, and the low PHY then converts these electric pulses into radio waves to be transmitted wirelessly by the antennae. The PHY similarly converts received radio waves into a digital signal. This layer may be implemented by a specialized PHY chip.

The PHY interfaces with the data link layer-layer 2 (L2) in the OSI model. The primary task of the L2 is to provide an interface between the higher transport layers and the PHY. The 5G L2 has three sublayers: media access control (MAC), Radio Link Control (RLC), and Packet Data Convergence Protocol (PDCP). Each of these can be considered a network function. The PDCP provides security of radio resource control (RRC) traffic and signaling data, sequence numbering and sequential delivery of RRC messages and IP packets, and IP packet header compression. The RLC protocol provides control of the radio link. The MAC protocol maps information between logical and transport channels.

The data link layer interfaces with layer 3 (L3) in the OSI model, the network layer. The 5G L3 is also referred to as the Radio Resource Control (RRC) layer and is responsible for functions such as packet forwarding, quality of service management, and the establishment, maintenance, and release of a RRC connection between the UE and RAN.

Various functional splits can be chosen for a RAN. The functional splits define different sets of the L1 and L2 functions which are run on the RU versus on the CU and DU. The L3 is also run on the CU. In a RAN architecture following split 7, for example, the functionality of the baseband unit (BBU) used in previous wireless network generations is split into two functional units: the DU which is responsible for real time L1 and L2 scheduling functions, and the CU which is responsible for non-real time, higher L2 and L3 functions. By contrast, in a RAN architecture following split 2, for example, only the PDCP from L2 is handled by the DU and CU, while RLC, MAC, PHY, and radio-frequency signals (RF) are handled by the RU. In split 5, for example, the DU and CU handle PDCP, RLC, and part of the MAC functions, while the RU handles part of the MAC as well as PHY and RF. In split 6, for example, the DU and CU handle PDCP, RLC, MAC, and the RU handles only PHY and RF. In split 8, for example, the DU and CU handle PDCP, RLC, MAC, and PHY, while the RU handles just RF.

An outage of any of these network functions can result in a loss of operation of the network as a whole, impacting any UE connected to the network. Accordingly, customers may request to implement the disclosed single slot oversubscription techniques for any or all of the network functions running on a RAN edge server in order to provide a more resilient, high availability network to the UE. A RAN edge server can be a cloud provider substrate extension as described herein, which may further incorporate a specialized PHY chip for L1 processing as described above. It will be appreciated that 5G RAN is just one use case for such an edge server, and customers may deploy cloud-managed edge servers on their premises for any desired type of workload, such as latency sensitive workloads which provide better performance when placed near other on-premise customer workloads (e.g., control systems for manufacturing operations, real time data analytics workloads, real time machine learning (ML) inference workloads). Further, although examples are presented herein of using single-slot oversubscription on limited capacity edge servers, it will be appreciated that such techniques are equally applicable to servers with larger capacity, for example servers running in a data center of a cloud provider environment, for providing higher workload availability while making most efficient usage of the underlying hardware.

FIG. 1 illustrates an environment for customer-initiated virtual machine resource allocation sharing according to some examples. As shown, a cloud provider network 100 includes hardware virtualization services 110 and a host computer system 150—typically one of many that form the pool of physical hardware resources available for virtualization. An edge location 199 includes a host computer system 160. As indicated above, cloud provider networks 100 often rely upon virtualization technologies. Virtualization technologies can provide users the ability to control or use virtualized computing environments where one or multiple virtualized computing environments are hosted by the same host. Thus, a user can directly use a compute resource (e.g., provided by a hardware virtualization service) hosted by the provider network to perform a variety of computing tasks. Exemplary virtualized computing environments include virtual machines and containers. Virtual machines are typically processes executed within a host operating system managed by a hypervisor or virtual machine manager (VMM). A virtual machine often operates a guest operating system within which other applications are executed. In some examples, an offload card that includes a dedicated processor can execute the hypervisor or VMM and other virtualization management components, freeing other host system resources.

The hardware virtualization services 110 (referred to in various implementations as an elastic compute service, a virtual machines service, a computing cloud service, a compute engine, or a cloud compute service) can enable users of the provider network 100 to provision and manage virtualized computing environments such as virtual machines. The launch of a virtual machine typically proceeds as follows. The hardware virtualization services 110 receive a launch request including one or more parameters. One such parameter is an indication of a type of virtual machine to launch. Virtual machine types typically define various resource amounts and/or levels to be provided to the virtual machine from the underlying host's physical hardware resources. Other parameters can include an identification of the software environment for the virtual machine (e.g., an identification of a guest operating system) or an identification of a machine image—typically a snapshot of a virtual machine, including various pre-loaded software—from which to launch the virtual machine.

The hardware virtualization services 110 can identify a host with sufficient resources to launch the requested virtual machine and then cause or otherwise direct an agent (e.g., a hypervisor, VMM) on the identified host to configure and launch the virtual machine using a particular machine image (whether specified in the request or associated with the identified software environment). The agent can retrieve the machine image from a data store, if not already stored locally on the host, launch a virtual machine process from the machine image, and allocate some portion of the underlying host system's resources to that process according to the corresponding virtual machine type.

Figure 2:
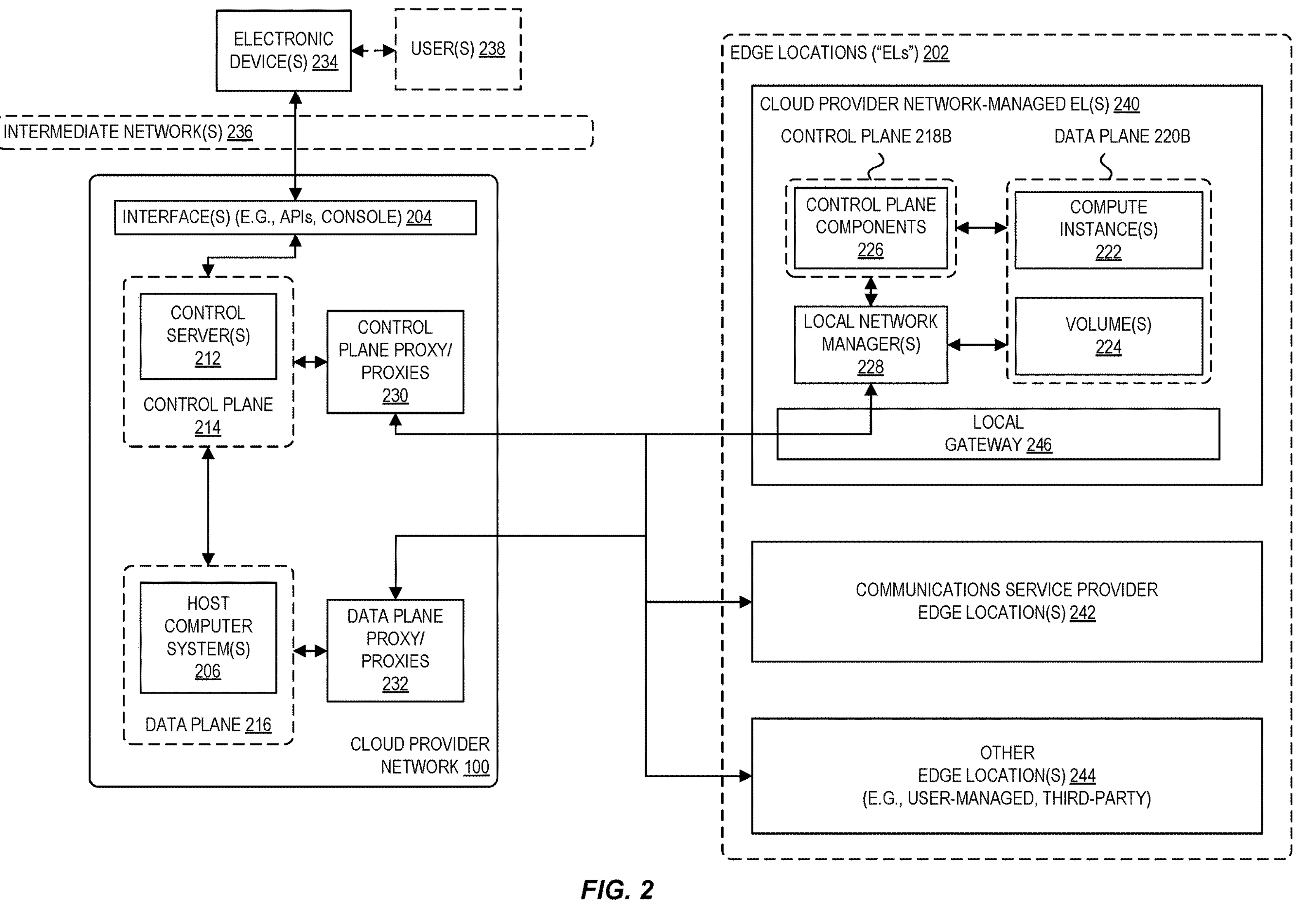
FIG. 2 illustrates an exemplary system including a cloud provider network and further including various edge locations of the cloud provider network according to some examples.

Turning ahead, FIG. 2 illustrates an exemplary system including a cloud provider network 100 and further including various edge locations 240, 242, 244 of the cloud provider network according to some examples. A cloud provider network (sometimes referred to simply as a "cloud") refers to a pool of network-accessible computing resources (such as compute, storage, and networking resources; applications and services), which can be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network provides users with the ability to use one or more of a variety of types of computing-related resources such as compute resources (e.g., executing virtual machine and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can manage virtual machines, a storage service that can store data objects, etc. The users (or "customers") of provider networks 100 can use one or more user accounts that are associated with a customer account, though these terms can be used somewhat interchangeably depending upon the context of use. Users can also refer to other services or applications executing within the cloud provider network (e.g., one service or application executing on one virtual machine request the launch of another virtual machine).

Users can connect to and interact with the cloud provider network resources and services using various interfaces—typically application programming interfaces ("APIs"). Communications between the user and the cloud provider network typically transit one or more intermediate network(s) (e.g., the public Internet). For example, a user 238 of an electronic device 234 can interact with the cloud provider network 100 via intermediate network(s) 236. The interactions can be via interface(s) 204, such as using APIs or a command-line, web-based, or other interface.

An API refers to an interface and/or communication protocol between a client and a server, such that if the client makes a request in a predefined format, the client should receive a response in a specific format or cause a defined action to be initiated. In the cloud provider network context, APIs provide a gateway for users to access cloud infrastructure by allowing users to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their users or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate can be isolated from the rest of the cloud provider network 100, for example it may not be possible to route from a substrate network address to an address in a production network that runs services of the cloud provider, or to a user network that hosts user resources.

The cloud provider network 100 can also include various overlay networks of virtualized computing resources that run on the substrate. In at least some examples, hypervisors or other devices or processes on the network substrate use encapsulation protocol technology to encapsulate and route network packets (e.g., client IP packets) over the network substrate between client resource instances on different hosts within the provider network. The encapsulation protocol technology can be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical computer system can have an IP address in the substrate network. Hardware virtualization technology can enable multiple virtual computing environments to run concurrently on a host computer, for example as virtual machines (VMs) on a compute server. A hypervisor or virtual machine manager (VMM) on a host allocates the host's hardware resources amongst various VMs executing on the host and monitors the execution of VMs. Each VM can be provided with one or more IP addresses in an overlay network or overlay networks, and the VMM on a host can be aware of the IP addresses of the VMs on the host. The VMMs (and/or other devices or processes on the network substrate) can use encapsulation protocol technology to encapsulate and route network packets (e.g., client IP packets) over the network substrate between virtualized resources on different hosts within the cloud provider network 100. The encapsulation protocol technology can be used on the network substrate to route encapsulated packets between endpoints on the network substrate via overlay network paths or routes. The encapsulation protocol technology can be viewed as providing a virtual network topology overlaid on the network substrate. In some examples, the encapsulation protocol technology includes the mapping service that maintains a mapping directory that maps IP overlay addresses (e.g., IP addresses visible to users) to substrate IP addresses (IP addresses not visible to users), which can be accessed by various processes on the cloud provider network for routing packets between endpoints.

As illustrated, the traffic and operations of the cloud provider network substrate can broadly be subdivided into two categories in various examples: control plane traffic carried over a logical control plane 214 and data plane operations carried over a logical data plane 216. While the data plane 216 represents the movement of user data through the distributed computing system, the control plane 214 represents the movement of control signals through the distributed computing system. The control plane 214 generally includes one or more control plane components or services distributed across and implemented by one or more control servers 212. Control plane traffic generally includes administrative operations, such as establishing isolated virtual networks (or "virtual private clouds") for users, monitoring resource usage and health, identifying a particular host on to launch a virtual machine, provisioning additional hardware as needed, and so on. The data plane 216 includes user resources that are implemented on the cloud provider network (e.g., virtual machines, containers, block storage volumes, databases, file storage, etc.). Data plane traffic generally includes non-administrative operations such as transferring data to and from resources.

As illustrated, the data plane 216 can include one or more host computer systems 206, which can be bare metal (e.g., single tenant) or can be virtualized by a hypervisor or VMM to run multiple VMs or microVMs for users. These host computer systems 206 can support a virtualized computing service of the cloud provider network, such as the hardware virtualization services 110. In some examples, the virtualized computing service is part of the control plane 214, allowing users to issue commands via an interface (e.g., interface 204) to launch and manage instances for their applications.

An edge location 202 provides resources and services of the cloud provider network 100 within a separate network, thereby extending functionality of the cloud provider network 100 to new locations (e.g., for reasons related to latency in communications with user devices, legal compliance, security, etc.). As indicated, such edge locations 202 can include cloud provider network-managed edge locations 240 (e.g., formed by servers located in a cloud provider-managed facility separate from those associated with the cloud provider network 100), communications service provider edge locations 242 (e.g., formed by servers associated with communications service provider facilities), user-managed edge locations 244 (e.g., formed by servers located on-premise in a user or partner facility), among other possible types of substrate extensions.

As illustrated in the example edge location 240, an edge location 202 can similarly include a logical separation between a control plane 218 and a data plane 220, respectively extending the control plane 214 and data plane 216 of the cloud provider network 100. In some examples, the edge location 202 is pre-configured, e.g., by the cloud provider network operator, with an appropriate combination of hardware with software and/or firmware elements to support various types of computing-related resources, and to do so in a manner that mirrors the experience of using the cloud provider network. For example, one or more edge location servers can be provisioned by the cloud provider for deployment within an edge location 202. As described above, in some examples, the cloud provider network 100 offers a set of predefined instance types, each having varying types and quantities of underlying hardware resources. Each instance type can also be offered in various sizes. In order to enable users to continue using the same instance types and sizes in an edge location 202 as they do in the region, the servers can be heterogeneous servers. A heterogeneous server can concurrently support multiple instance sizes of the same type and can be also reconfigured to host whatever instance types are supported by its underlying hardware resources. The reconfiguration of the heterogeneous server can occur on-the-fly using the available capacity of the servers, that is, while other VMs are still running and consuming other capacity of the edge location servers. This can improve utilization of computing resources within the edge location by allowing for better packing of running instances on servers, and also provides a seamless experience regarding instance usage across the cloud provider network 100 and the cloud provider network edge location.

As illustrated, the edge location servers can host one or more compute instances 222. Compute instances 222 can be VMs, or containers that package up code and dependencies so an application can run quickly and reliably across computing environments (e.g., including VMs). In addition, the servers can host one or more data volumes 224, if desired by the user. In the region of a cloud provider network 100, such volumes can be hosted on dedicated block store servers. However, due to the possibility of having a significantly smaller capacity at an edge location 202 than in the region, an optimal utilization experience may not be provided if the edge location includes such dedicated block store servers. Accordingly, a block storage service can be virtualized in the edge location 202, such that one of the VMs runs the block store software and stores the data of a volume 224. Similar to the operation of a block storage service in the region of a cloud provider network 100, the volumes 224 within an edge location 202 can be replicated for durability and availability. The volumes can be provisioned within their own isolated virtual network within the edge location 202. The compute instances 222 and any volumes 224 collectively make up a data plane extension 220 of the provider network data plane 216 within the edge location 202.

The servers within an edge location 202 can, in some implementations, host certain local control plane components 226, for example, components that enable the edge location 202 to continue functioning if there is a break in the connection back to the cloud provider network 100. Examples of these components include a migration manager that can move compute instances 222 between edge location servers if needed to maintain availability, and a key value data store that indicates where volume replicas are located. However, generally the control plane 218 functionality for an edge location will remain in the cloud provider network 100 to allow users to use as much resource capacity of the edge location as possible.

In some examples, server software running at an edge location 202 is designed by the cloud provider to run on the cloud provider substrate network and this software can be enabled to run unmodified in an edge location 202 by using local network manager(s) 228 to create a private replica of the substrate network within the edge location (a "shadow substrate"). The local network manager(s) 228 can run on edge location 202 servers and bridge the shadow substrate with the edge location 202 network, for example, by acting as a VPN endpoint or endpoints between the edge location 202 and the proxies 230, 232 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 228 allow resources in the edge location 202 to seamlessly communicate with resources in the cloud provider network 100. In some implementations, a single local network manager can perform these actions for all servers hosting compute instances 222 in an edge location 202. In other implementations, each of the server hosting compute instances 222 have a dedicated local network manager. In multi-rack edge locations, inter-rack communications can go through the local network managers, with local network managers maintaining open tunnels to one another.

Edge locations can utilize secure networking tunnels through the edge location 202 network to the cloud provider network 100, for example, to maintain security of user data when traversing the edge location 202 network and any other intermediate network (which can include the public internet). Within the cloud provider network 100, these tunnels are composed of virtual infrastructure components including isolated virtual networks (e.g., in the overlay network), control plane proxies 230, data plane proxies 232, and substrate network interfaces. In some examples, such proxies are implemented as containers running on compute instances. In some examples, each server in an edge location 202 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some examples, a direct connection between an edge location 202 location and the cloud provider network 100 can be used for control and data plane communications. As compared to a VPN through other networks, the direct connection can provide constant bandwidth and more consistent network performance because of its relatively fixed and stable network path.

A control plane (CP) proxy 230 can be provisioned in the cloud provider network 100 to represent particular host(s) in an edge location. CP proxies are intermediaries between the control plane 214 in the cloud provider network 100 and control plane targets in the control plane 218 of edge location 202. That is, CP proxies 230 provide infrastructure for tunneling management API traffic destined for edge location servers out of the region substrate and to the edge location 202. For example, a virtualized computing service of the cloud provider network 100 can issue a command to a VM NI of a server of an edge location 202 to launch a compute instance 222. A CP proxy maintains a tunnel (e.g., a VPN) to a local network manager 228 of the edge location. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies can be instantiated one-for-one with servers at an edge location 202 or can manage control plane traffic for multiple servers in the same edge location.

A data plane (DP) proxy 232 can also be provisioned in the cloud provider network 100 to represent particular server(s) in an edge location 202. The DP proxy 232 acts as a shadow or anchor of the server(s) and can be used by services within the cloud provider network 100 to monitor health of the host (including its availability, used/free compute and capacity, used/free storage and capacity, and network bandwidth usage/availability). The DP proxy 232 also allows isolated virtual networks to span edge locations 202 and the cloud provider network 100 by acting as a proxy for server(s) in the cloud provider network 100. Each DP proxy 232 can be implemented as a packet-forwarding compute instance or container. As illustrated, each DP proxy 232 can maintain a VPN tunnel with a local network manager 228 that manages traffic to the server(s) that the DP proxy 232 represents. This tunnel can be used to send data plane traffic between the edge location server(s) and the cloud provider network 100. Data plane traffic flowing between an edge location 202 and the cloud provider network 100 can be passed through DP proxies 232 associated with that edge location. For data plane traffic flowing from an edge location 202 to the cloud provider network 100, DP proxies 232 can receive encapsulated data plane traffic, validate it for correctness, and allow it to enter into the cloud provider network 100. DP proxies 232 can forward encapsulated traffic from the cloud provider network 100 directly to an edge location 202.

Local network manager(s) 228 can provide secure network connectivity with the proxies 230, 232 established in the cloud provider network 100. After connectivity has been established between the local network manager(s) 228 and the proxies, users may issue commands via the interface 204 to instantiate compute instances (and/or perform other operations using compute instances) using edge location resources in a manner analogous to the way in which such commands would be issued with respect to compute instances hosted within the cloud provider network 100. From the perspective of the user, the user can now seamlessly use local resources within an edge location (as well as resources located in the cloud provider network 100, if desired). The compute instances set up on a server at an edge location 202 can communicate both with electronic devices located in the same network as well as with other resources that are set up in the cloud provider network 100, as desired. A local gateway 246 can be implemented to provide network connectivity between an edge location 202 and a network associated with the extension (e.g., a communications service provider network in the example of an edge location 242).

Figure 3:
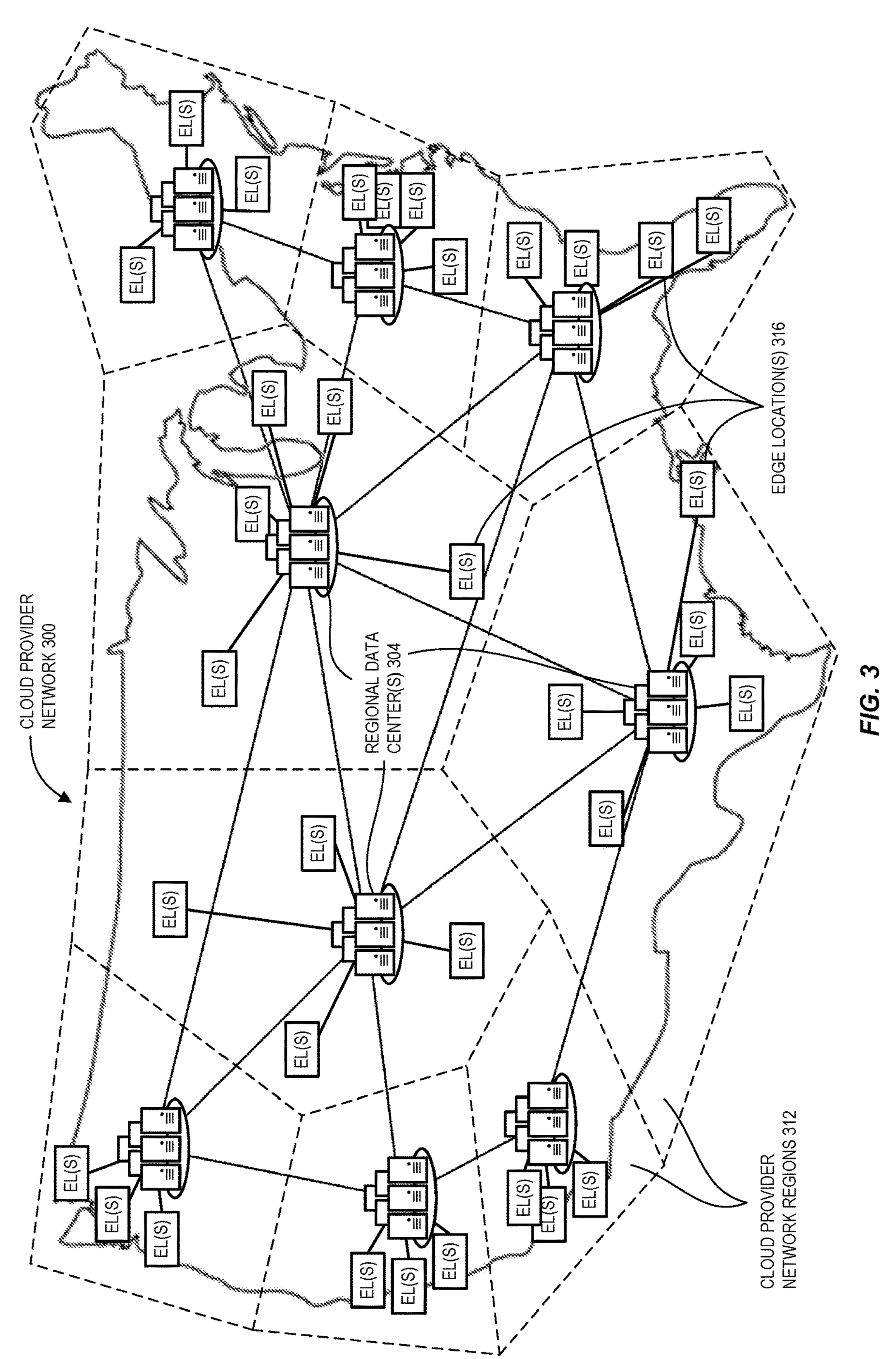
FIG. 3 illustrates an exemplary cloud provider network including geographically dispersed edge locations according to some examples.

FIG. 3 illustrates an exemplary cloud provider network including geographically dispersed edge locations according to some examples. A cloud provider network can be formed as a number of regions, where a region is a geographical area in which the cloud provider clusters data centers. Each region can include multiple (e.g., two or more) availability zones (AZs) connected to one another via a private high-speed network, for example a fiber communication connection. An AZ (also known as an availability domain) is thus one type of "deployment zone" that provides an isolated failure domain including one or more data center facilities with separate power, separate networking, and separate cooling from those in another. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time. As illustrated in FIG. 3, a cloud provider network 300 (e.g., the cloud provider network 100, 200) is formed of a number of regions 312, where a region is a separate geographical area in which the cloud provider has one or more data centers 304. Each region 312 can include two or more AZs (not shown) connected to one another via a private high-speed network such as, for example, a fiber communication connection. Of course, cloud provider networks can extend beyond the United States to a global reach.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a virtual private network (VPN) tunnel or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

In comparison to the number of regional data centers or AZs, the number of edge locations 316 can be much higher. Such widespread deployment of edge locations 316 can provide low-latency connectivity to the cloud for a much larger group of end user devices (in comparison to those that happen to be very close to a regional data center). In some examples, each edge location 316 can be peered or "homed" to some portion of the cloud provider network 300 (e.g., a parent availability zone or regional data center). Such peering allows the various components operating in the cloud provider network to manage the compute resources of the edge location. In some cases, multiple edge locations are sited or installed in the same facility (e.g., separate racks of computer systems) and managed by different zones or data centers to provide additional redundancy. Note that although edge locations are typically depicted herein as within a communications service provider ("CSP") network, in some cases, such as when a cloud provider network facility is relatively close to a communications service provider facility, the edge location can remain within the physical premises of the cloud provider network while being connected to the communications service provider network via a fiber or other network link.

The parenting of a given edge location to an AZ or region of the cloud provider network can be based on a number of factors. One such parenting factor is data sovereignty. For example, to keep data originating from a particular CSP network in one country within that same country, the edge locations deployed within that CSP network can be parented to AZs or regions within that country. Another factor may be the availability of services. For example, some edge locations can have different hardware configurations such as the presence or absence of components such as local non-volatile storage for user data (e.g., solid state drives), graphics accelerators, etc. Some AZs or regions might lack the services to exploit those additional resources, thus, an edge location could be parented to an AZ or region that supports the use of those resources. Another factor can be the latency between the AZ or region and the edge location. While the deployment of edge locations within a CSP network has latency benefits, those benefits might be negated by parenting an edge location to a distant AZ or region that introduces significant latency for edge location to region traffic. Accordingly, edge locations are often parented to nearby (in terms of network latency) AZs or regions.

Figure 4:
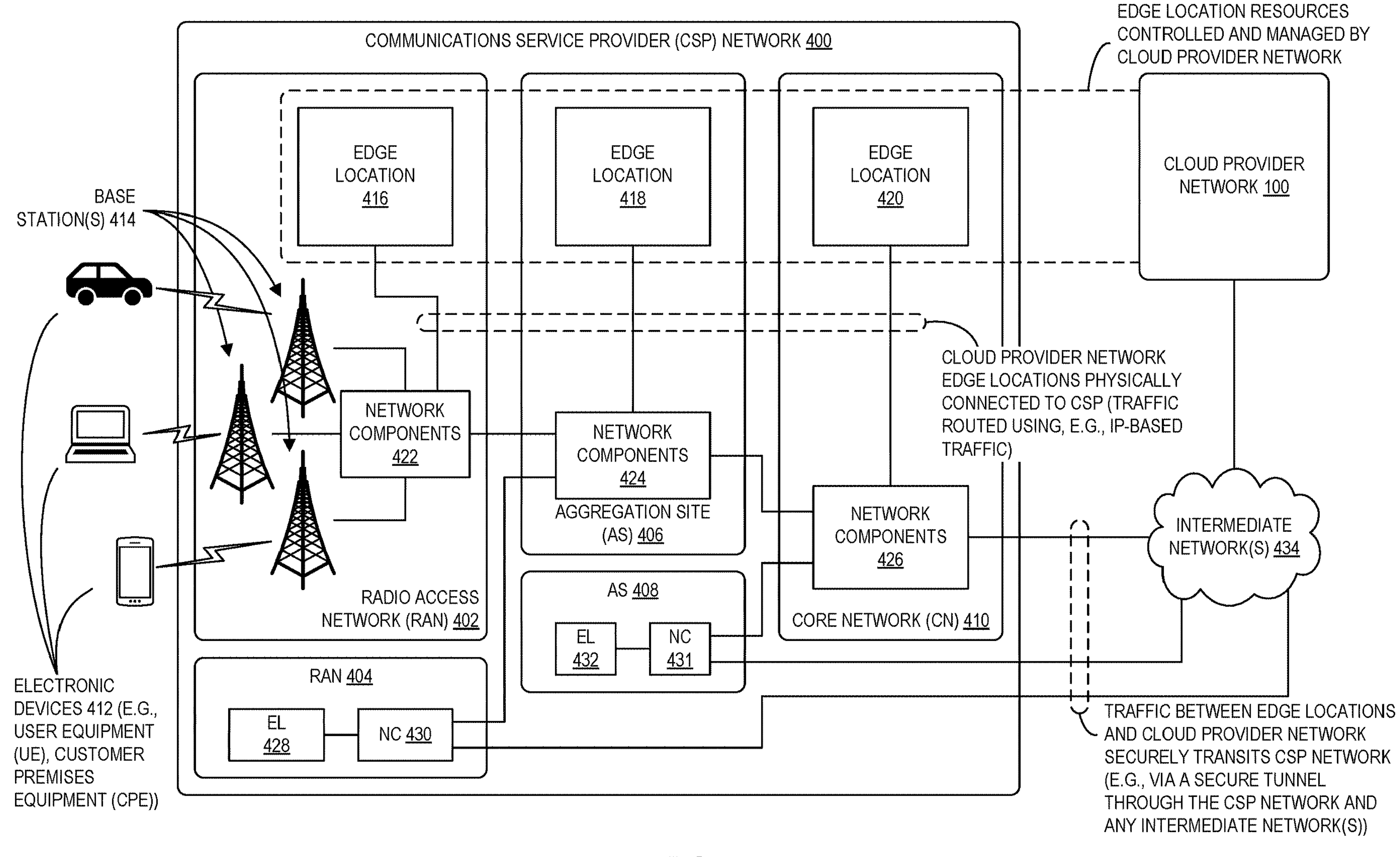
FIG. 4 illustrates an exemplary system in which cloud provider network edge locations are deployed within a communications service provider network according to some examples.

FIG. 4 illustrates an exemplary system in which cloud provider network edge locations are deployed within a communications service provider network according to some examples. A CSP network 400 generally includes a downstream interface to end user electronic devices and an upstream interface to other networks (e.g., the internet). In this example, the CSP network 400 is a wireless "cellular" CSP network that includes radio access networks (RAN) 402, 404, aggregation sites (AS) 406, 408, and a core network (CN) 410. The RANs 402, 404 include base stations (e.g., NodeBs, eNodeBs, gNodeBs) that provide wireless connectivity to electronic devices 412. The core network 410 typically includes functionality related to the management of the CSP network (e.g., billing, mobility management, etc.) and transport functionality to relay traffic between the CSP network and other networks. Aggregation sites 406, 408 can serve to consolidate traffic from many different radio access networks to the core network and to direct traffic originating from the core network to the various radio access networks.

From left to right in FIG. 4, end user electronic devices 412 wirelessly connect to base stations (or radio base stations) 414 of a radio access network 402. Such electronic devices 412 are sometimes referred to as user equipment (UE) or customer premises equipment (CPE). Data traffic is often routed through a fiber transport network consisting of multiple hops of layer 3 routers (e.g., at aggregation sites) to the core network 410. The core network 410 is typically housed in one or more data centers. For data traffic destined for locations outside of the CSP network 400, the network components 422-426 typically include a firewall through which traffic can enter or leave the CSP network 400 to external networks such as the internet or a cloud provider network 100. Note that in some examples, the CSP network 400 can include facilities to permit traffic to enter or leave from sites further downstream from the core network 410 (e.g., at an aggregation site or RAN).

Edge locations 416-420 (or, "wavelength zones") include computing resources managed as part of a cloud provider network but installed or sited within various points of a CSP network (e.g., on premise in a CSP owned or leased space). The computing resources typically provide some amount of compute and memory capacity that the cloud provider can allocate for use by its users. The computing resources can further include storage and accelerator capacity (e.g., solid-state drives, graphics accelerators, etc.). Here, edge locations 416, 418, and 420 are in communication with a cloud provider network 100.

Typically, the further—e.g., in terms of network hops and/or distance—an edge location is from the cloud provider network 100 (or closer to electronic devices 412), the lower the network latency is between computing resources within the edge location and the electronic devices 412. However, physical site constraints often limit the amount of edge location computing capacity that can be installed at various points within the CSP or determine whether computing capacity can be installed at various points at all. For example, an edge location sited within the core network 410 can typically have a much larger footprint (in terms of physical space, power requirements, cooling requirements, etc.) than an edge location sited within the RAN 402, 404.

The installation or siting of edge locations within a CSP network can vary subject to the particular network topology or architecture of the CSP network. As indicated in FIG. 4, edge locations can generally be connected anywhere the CSP network can break out packet-based traffic (e.g., IP based traffic). Additionally, communications between a given edge location and the cloud provider network 100 typically securely transit at least a portion of the CSP network 400 (e.g., via a secure tunnel, virtual private network, a direct connection, etc.). In the illustrated example, the network components 422 facilitate the routing of data traffic to and from an edge location 416 integrated with the RAN 402, the network components 424 facilitate the routing of data traffic to and from an edge location 418 integrated with the AS 406, and the network components 426 facilitate the routing of data traffic to and from an edge location 420 integrated with the CN 410. Network components 422-426 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some examples, traffic between an edge location 428 and the cloud provider network 100 can be broken out of the CSP network 400 without routing through the core network 410. For example, network components 430 of a RAN 404 can be configured to route traffic between an edge location 416 of the RAN 404 and the cloud provider network 100 without traversing an aggregation site or core network 410. As another example, network components 431 of an aggregation site 408 can be configured to route traffic between an edge location 432 of the aggregation site 408 and the cloud provider network 100 without traversing the core network 410. The network components 430, 431 can include a gateway or router having route data to direct traffic from the edge location destined for the cloud provider network 100 to the cloud provider network 100 (e.g., through a direct connection or an intermediate network 434) and to direct traffic from the cloud provider network 100 destined for the edge location to the edge location.

In some examples, edge locations can be connected to more than one CSP network. For example, when two CSPs share or route traffic through a common point, an edge location can be connected to both CSP networks. For example, each CSP can assign some portion of its network address space to the edge location, and the edge location can include a router or gateway that can distinguish traffic exchanged with each of the CSP networks. For example, traffic destined for the edge location from one CSP network might have a different destination IP address, source IP address, and/or virtual local area network (VLAN) tag than traffic received from another CSP network. Traffic originating from the edge location to a destination on one of the CSP networks can be similarly encapsulated to have the appropriate VLAN tag, source IP address (e.g., from the pool allocated to the edge location from the destination CSP network address space) and destination IP address.

Note that while the exemplary CSP network architecture of FIG. 4 includes radio access networks, aggregation sites, and a core network, the architecture of a CSP network can vary in naming and structure across generations of wireless technology, between different CSPs, as well as between wireless and fixed-line CSP networks. Additionally, while FIG. 4 illustrates several locations where an edge location can be sited within a CSP network, other locations are possible (e.g., at a base station).

Figure 5:
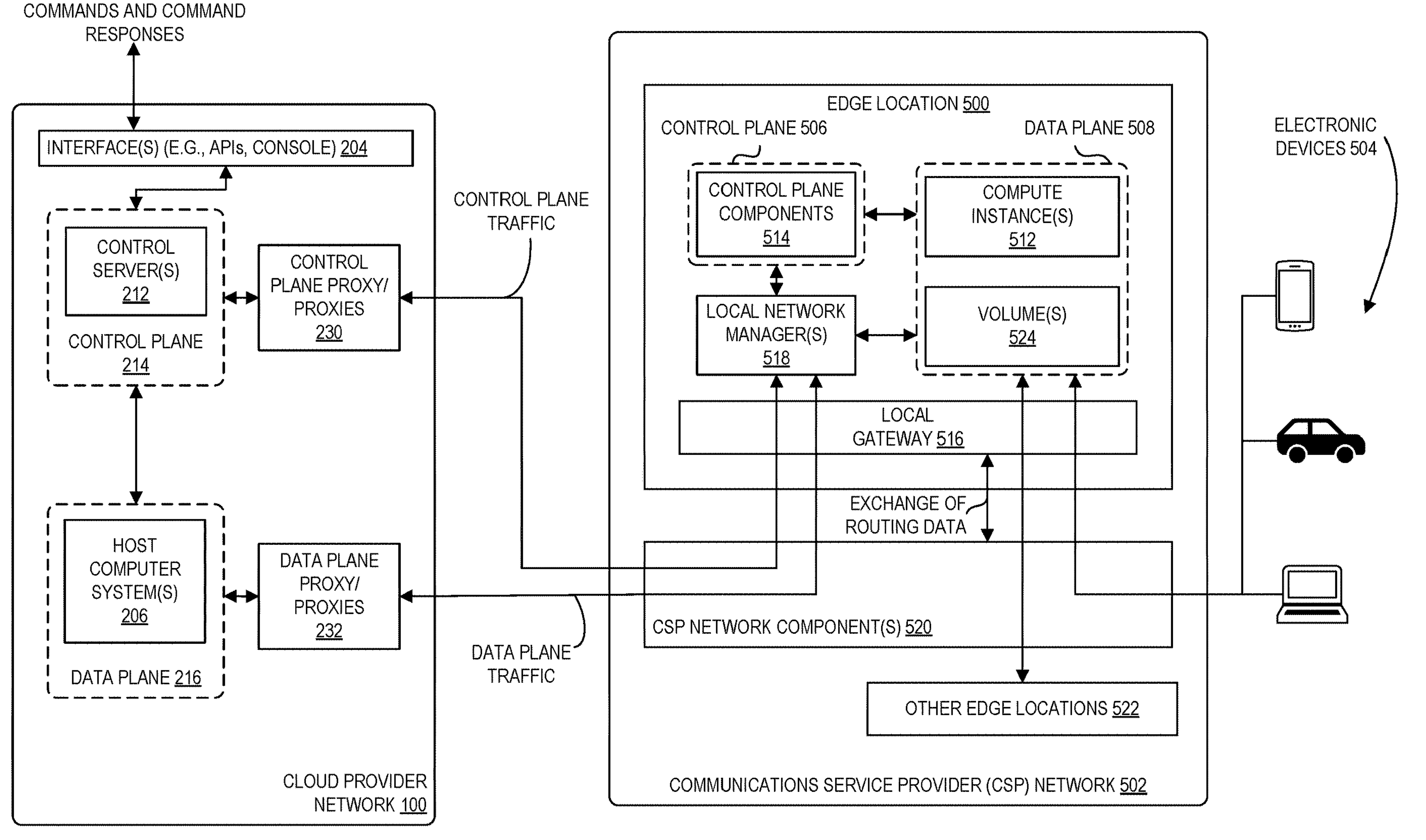
FIG. 5 illustrates in greater detail exemplary components of and connectivity between a cloud provider network and an edge location within a communications service provider network according to some examples.

FIG. 5 illustrates in greater detail exemplary components of and connectivity between a cloud provider network and an edge location within a CSP network according to some examples. An edge location 500 provides resources and services of the cloud provider network within a CSP network 502 thereby extending functionality of the cloud provider network 100 to be closer to end user devices 504 connected to the CSP network.

As was the case for edge locations 202, the edge location 500 similarly includes a logical separation between a control plane 506 and a data plane 508, respectively extending the control plane 214 and data plane 216 of the cloud provider network 100. The edge location 500 can be pre-configured, e.g., by the cloud provider network operator, with an appropriate combination of hardware with software and/or firmware elements to support various types of computing-related resources, and to do so in a manner that mirrors the experience of using the cloud provider network. Computer systems of the edge location 500 can host control plane components 514, local network manager(s) 518, volume(s) 524, and compute instances 512 (e.g., virtual machines).

A local gateway 516 can be implemented to provide network connectivity between the edge location 300 and the CSP network 502. The cloud provider can configure the local gateway 516 with an IP address on the CSP network 502 and to exchange routing data (e.g., via the Border Gateway Protocol (BGP)) with the CSP network components 520. The local gateway 516 can include one or more route tables that control the routing of inbound traffic to the edge location 500 and outbound traffic leaving the edge location 500. The local gateway 516 can also support multiple VLANs in cases where the CSP network 502 uses separate VLANs for different portions of the CSP network 502 (e.g., one VLAN tag for the wireless network and another VLAN tag for a fixed network).

In some examples of an edge location 500, the extension includes one or more switches, sometimes referred to top of rack (ToR) switches (e.g., in rack-based examples). The ToR switches are connected to CSP network routers (e.g., CSP network components 520), such as Provider Edge (PE) or Software Defined Wide Area Network (SD-WAN) routers. Each ToR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 100 to add more peering links to an edge location without adjustments to routing. Each of the ToR switches can establish eBGP sessions with the carrier PE or SD-WAN routers. The CSP can provide a private Autonomous System Number (ASN) for the edge location and an ASN of the CSP network 502 to facilitate the exchange of routing data.

Data plane traffic originating from the edge location 500 can have a number of different destinations. For example, traffic addressed to a destination in the data plane 216 of the cloud provider network 100 can be routed via the data plane connection between the edge location 500 and the cloud provider network 100. The local network manager 518 can receive a packet from a compute instance 512 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 512 addressed to another compute instance hosted in another edge location 522, the local network manager 518 can encapsulate the packet with a destination as the IP address assigned to the other edge location 522, thereby allowing the CSP network components 520 to handle the routing of the packet. Alternatively, if the CSP network components 520 do not support inter-edge location traffic, the local network manager 518 can address the packet to a relay in the cloud provider network 100 that can send the packet to the other edge location 522 via its data plane connection (not shown) to the cloud provider network 100. Similarly, for traffic from a compute instance 512 address to a location outside of the CSP network 502 or the cloud provider network 100 (e.g., on the internet), if the CSP network components 520 permit routing to the internet, the local network manager 518 can encapsulate the packet with a source IP address corresponding to the IP address in the carrier address space assigned to the compute instance 512. Otherwise, the local network manager 518 can send the packet to an Internet Gateway in the cloud provider network 100 that can provide internet connectivity for the compute instance 512. For traffic from a compute instance 512 addressed to an electronic device 504, the local gateway 516 can use Network Address Translation (NAT) to change the source IP address of the packet from an address in an address space of the cloud provider network to an address space of the carrier network.

The local gateway 516, local network manager(s) 518 and other local control plane components 514 can run on the same servers that host compute instances 512, can run on dedicated processor(s) (e.g., on an offload card) integrated with edge location servers or can be executed by servers separate from those that host user resources.

Returning to FIG. 1, the hardware virtualization services 110 manage the hosting of compute instances such as virtual machines by host computer systems within the cloud provider network (e.g., host computer system 150) or at cloud provider network edge locations (e.g., host computer system 160).

As illustrated, the host computer system 150 has some set of hardware resources 152, and the host computer system 160 has some set of hardware resources 162. Hardware resources can include one or more processors or central processing units (CPUs), memory (e.g., system memory, storage devices), network adapters, and other hardware such as graphics accelerators, signal processors, and so on. Given the number of hosts spanning a cloud provider network and its edge locations can be very large, and with many of those hosts having different hardware configurations, various techniques can be employed to track the availability of hardware resources.

Recall that a cloud provider network can offer virtual machines characterized by instance "types." Various instance types can offer different levels of CPU, memory, and networking capacity, and can include other features such as storage capacity, special hardware access, etc. For example, one virtual machine type might have two virtual processors, 8 gigabytes of memory, 10 gigabits/second network throughput, while another virtual machine type might have four virtual processors, 16 gigabytes of memory, 15 gigabits/second network throughput, and an attached accelerator card (e.g., a graphics processor, a signal processor, etc.).

In parallel, each host computer system can have its associated hardware resources logically divided up into a number of slots, where each slot is associated with one or more instance types and represents some amount of host resources that will be or are allocated to an instance that "fills" the slot. In some examples, each host has an associated template (typically tracked in the control plane) that defines the slots on that host. Different templates can divvy up a host's resources in different ways. To illustrate, suppose there are two instance types, small and large, and that the large instance type has twice the resource allocation of the small instance type. If a particular host computer system has the hardware resources to support two large instance types, the various templates can include slots for two large instances, one large and two small instances, and four small instances.

The hardware virtualization services 110 can track the availability of host hardware resources that can be allocated to virtual machines using host resource allocation data 111. The host resource allocation data 111 can have, for each host computer system, an identification of a plurality of slots (e.g., such as those defined by a template associated with the host computer system) and an associated status identifier for each slot. In some examples, the status identifier may be an indication of whether the slot is used or available (e.g., a "1" and a "0"), and the host resource allocation data 111 may further include an identification of the instance(s) that have been allocated resources associated with the slot, if any. Assume, for example, that each of host computer systems 150, 160 are associated with a template that divides them into four equally sized slots for an instance of a given type. Illustrated graphically in FIG. 1, the slots are based on a template with a filled in slot corresponding to an occupied instance. Prior to the launch of any additional instances, the initial state of the host computer system 150 is a single occupied slot, while the initial state of the host computer system 160 is all four occupied slots. The hardware virtualization services 110 can store the host resource allocation data 111 in a database or other data store as follows:

| Host Identifier | Slot | Status | Instance Identifier(s) |
|---|---|---|---|
| | | . . . | |
| 1234 | 0 | 0 (available) | |
| 1234 | 1 | 0 | |
| 1234 | 2 | 0 | |
| 1234 | 3 | 1 | ABCD |
| 5678 | 0 | 1 | BCDE |
| 5678 | 1 | 1 | CDEF |
| 5678 | 2 | 1 | DEFA |
| 5678 | 3 | 1 | EFAB |
| | | . . . | |

In the above example, host identifier "1234" corresponds to host computer system 150 and host identifier "5678" corresponds to host computer system 160. Instance identifiers correspond to the instances allocated portions of host system resources represented by the corresponding slot.

In some examples, an empty status identifier may indicate a slot is available, while a non-empty status identifier may include an identification of the instance(s) that have been allocated resources associated with the slot. Using the same scenario as before, the host resource allocation data 111 may be stored in a database or other data store as follows:

| Host Identifier | Slot | Status |
|---|---|---|
| | . . . | |
| 1234 | 0 | |
| 1234 | 1 | |
| 1234 | 2 | |
| 1234 | 3 | ABCD |
| 5678 | 0 | BCDE |
| 5678 | 1 | CDEF |
| 5678 | 2 | DEFA |
| 5678 | 3 | EFAB |
| | . . . | |

Two exemplary resource-sharing virtual machine launch workflows are now described. In the first resource-sharing virtual machine launch workflow, the hardware virtualization services 110 receives a launch request from an electronic device 101 as indicated at circle (1), which may be operated by a user 108. In this example workflow, the launch request includes an indication of an existing virtual machine with which the requested virtual machine will share resources. For example, the request can include an identification of the virtual machine 168-1 that, until the requested virtual machine is launched, is a standalone virtual machine (e.g., operating with the full resource allocation available to a virtual machine of that typed).

The hardware virtualization services 110 can determine the identity of the host computer system 160 (e.g., an IP address) hosting the identified virtual machine in instance tracking data (not shown) that provides a lookup of virtual machine identifiers to their current host computer system. Here, the hardware virtualization services 110 identify the host computer system 160, which is currently host to four virtual machines as indicated in host resource allocation data 111.

Once the host computer system is identified, the hardware virtualization services 110 can send a request to cause a launch of a resource-sharing VM to a VMM 166 (or other hypervisor, agent) of the host computer system 160 that manages hosted virtual machines as indicated at circle (2). The request can include an identification of the instance with which the resource-sharing VM will share resources. The request can further include an identification of a machine image from which to launch the virtual machine and/or networking configuration data (such as whether to attach an existing or new elastic network interface, described below, the addressing configuration for a new elastic network interface, etc.). Where the identified host computer system is part of an edge location, the hardware virtualization services 110 can send the request via a secure tunnel to the edge location 199 through one or more intermediate networks (not shown). In some examples, the request is sent via a tunnel dedicated to control plane traffic. Additional details on the connectivity between the cloud provider network and edge locations are provided with references to FIGS. 2-5.

The VMM 166 can then launch the resource-sharing VM as a new VM (e.g., a process) 168-2 within a host operating system 164. The VMM 166 can then configure host operating system 164 to share the resources originally allocated to the VM 168-1 amongst VMs 168-1 and 168-2—now both resource-sharing virtual machines. At a high level, the host operating system can include one or more software applications or tools that can ensure both resource-sharing VMs contend for the same processing resources, memory resources, networking resources, and so on, typically without interfering with the operation of any other VMs 169 hosted by the host computer system 160. Additional details on various resource sharing techniques are provided below with reference to FIGS. 6-8.

Typically, the VMM 166 will provide a positive response to the circle (2) request to inform the hardware virtualization services 110 that the requested resource sharing VM was successfully launched. At circle (3), the hardware virtualization services 110 can update the host resource allocation data 111 to reflect the resource-sharing instances. Illustrated graphically in FIG. 3, the left-most slot of host computer system 160 now has two virtual machines associated with it. Using the above data structures, the hardware virtualization services 110 can update the host resource allocation data 111 such as described in the above examples as follows:

| Host Identifier | Slot | Status | Instance Identifiers(s) |
|---|---|---|---|
| | | . . . | |
| 5678 | 0 | 1 | BCDE, FABC |
| | | . . . | |

| Host Identifier | Slot | Status |
|---|---|---|
| | . . . | |
| 5678 | 0 | BCDE, FABC |
| | . . . | |

In the above updated host resource allocation data 111 examples, slot 0 corresponds to the slot originally assigned to the virtual machine with identifier BCDE, now a resource-sharing virtual machine along with the virtual machine with identifier FABC.

In the second resource-sharing virtual machine launch workflow, the hardware virtualization services 110 receives a launch request from an electronic device 101 as indicated at circle (4), which may be operated by a user 108. In this example workflow, the launch request is for two resource-sharing virtual machines, neither of which have been launched, and includes a type of the virtual machines.

The hardware virtualization services 110 can determine one or more candidate host systems on which to launch the requested instances. Since the request is for resource-sharing VMs, the hardware virtualization services 110 can identify one or more host computer systems having one or more available slots representing available host system resources for one standalone virtual machine of the requested type. The hardware virtualization services 110 can then select one of the identified host computer systems. In this example, the hardware virtualization services 110 identifies and selects host computer system 150, which is currently host to a single virtual machine (as indicated in the right most slot of host resource allocation data 111).

The hardware virtualization services 110 can then send a request to cause a launch of the resource-sharing VMs to a VMM 156 (or other hypervisor, agent) of the host computer system 150 that manages hosted virtual machines as indicated at circle (5). The request at circle (5) can include hardware configuration data such as a number of processor cores to allocate based on the virtual machine type, an amount of memory to allocate or otherwise limit based on the virtual machine type, whether to attach any special hardware, etc. The VMM 156 can use the hardware configuration data to allocate resources associated with one virtual machine of the identified virtual machine type to the requested two resource-sharing virtual machines of the virtual machine type.

The request at circle (5) can further include an identification of a machine image from which to launch the two resource-sharing virtual machines or an identification of two machine images, if different. The request at circle (5) can further include networking configuration data (such as whether to attach an existing or new elastic network interface, described below, the addressing configuration for a new elastic network interface, etc.).

The VMM 156 can then launch the resource-sharing VMs two new VMs (e.g., processes) 158-1 and 158-2 within a host operating system 164. The VMM 156 can then configure host operating system 154 to share the resources associated with a single virtual machine of the specified type amongst resource-sharing VMs 158-1 and 158-2 of that type.

Typically, the VMM 156 will provide a positive response to the circle (5) request to inform the hardware virtualization services 110 that the requested resource sharing VMs were successfully launched. At circle (6), the hardware virtualization services 110 can update the host resource allocation data 111 to reflect the resource-sharing instances. Illustrated graphically in FIG. 3, the left-most slot of host computer system 150 now has two virtual machines associated with it. Using the above data structures, the hardware virtualization services 110 can update the host resource allocation data 111 such as described in the above examples as follows:

| Host Identifier | Slot | Status | Instance Identifier(s) |
|---|---|---|---|
| | | . . . | |
| 1234 | 0 | 1 | AB12, AB34 |
| | | . . . | |

| Host | Slot | Status |
|---|---|---|
| | . . . | |
| 1234 | 0 | AB12, AB34 |
| | . . . | |

In the above updated host resource allocation data 111 examples, slot 0 corresponds to the left-most originally empty slot of the host computer system 1234, now indicating an allocation of host system resources between the two resource-sharing virtual machines with identifiers AB12 and AB34.

More generally, a launch request such as indicated at circles (1), (4) may originate from within or without of the cloud provider network 100 (e.g., from the electronic device 101, as depicted, or from another virtual machine or service of or associated with the cloud provider network). The request can be sent on behalf of a user or customer, such as at the direction of a customer controlling the source of the request or by another service, such as a managed service, carrying out operations for a customer.

Although the above examples contemplate pairs of resource-sharing virtual machines such as VMs 158 and VMs 168, the launch of additional resource-sharing VMs using the same resource allocation is possible using the techniques described herein resulting in resource-sharing groups of two or more virtual machines.

In some examples, the process of allocating resources to a virtual machine includes launching the virtual machine process and then limiting that virtual machine process (or multiple resource-sharing virtual machine processes) to some portion of the overall amount of resources of the host computer system based on the virtual machine type. Similarly, launching a resource-sharing virtual machine with an existing virtual machine includes launching the new virtual machine and then limiting the new virtual machine to the same portion of the overall amount of resources of the host computer system as permitted to the original virtual machine.

In some examples, the requests at circles (1) and (4) can include an indication of whether to place a launched virtual machine (e.g., newly launched VM 168-2, one of VMs 158-1 and 158-2) in a paused or suspended state once launched. Such an indication can be useful in use-cases such as where one of the resource-sharing virtual machines is being used as a failover backup but is otherwise not needed until the primary virtual machine fails. The hardware virtualization services 110 can pass such an indication along to the VMM of a host computer system to cause the VMM to pause the virtual machine once launched. at circles (2) and (5) to cause the VMM to place a newly launched virtual machine in a paused state. Sometime later, the hardware virtualization services 110 can receive a request to resume the paused virtual machine, such as from a user 108 via the electronic device 101, from another customer virtual machine hosted within the provider network that is monitoring the primary virtual machine, from a health monitoring service of the provider network, etc.

The hardware virtualization services 110 can also support resource-sharing virtual machine termination. For example, the hardware virtualization services 110 can receive a request to terminate a resource-sharing virtual machine that includes an identifier of the virtual machine to be terminated. The hardware virtualization services 110 can determine the identity of the host computer system hosting the identified virtual machine in instance tracking data, described above. The hardware virtualization services 110 can send a request to cause a VMM of the associated host computer system to terminate the identified virtual machine.

Figure 6:
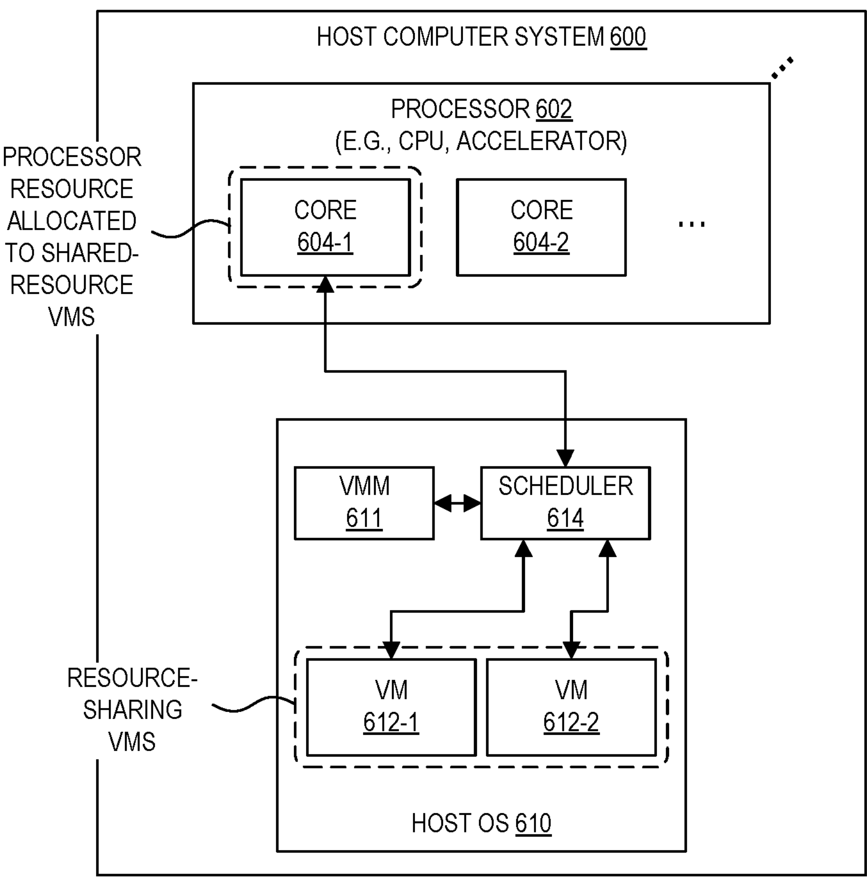
FIG. 6 illustrates an environment for sharing processing resources amongst resource-sharing virtual machines according to some examples.
Figure 7:
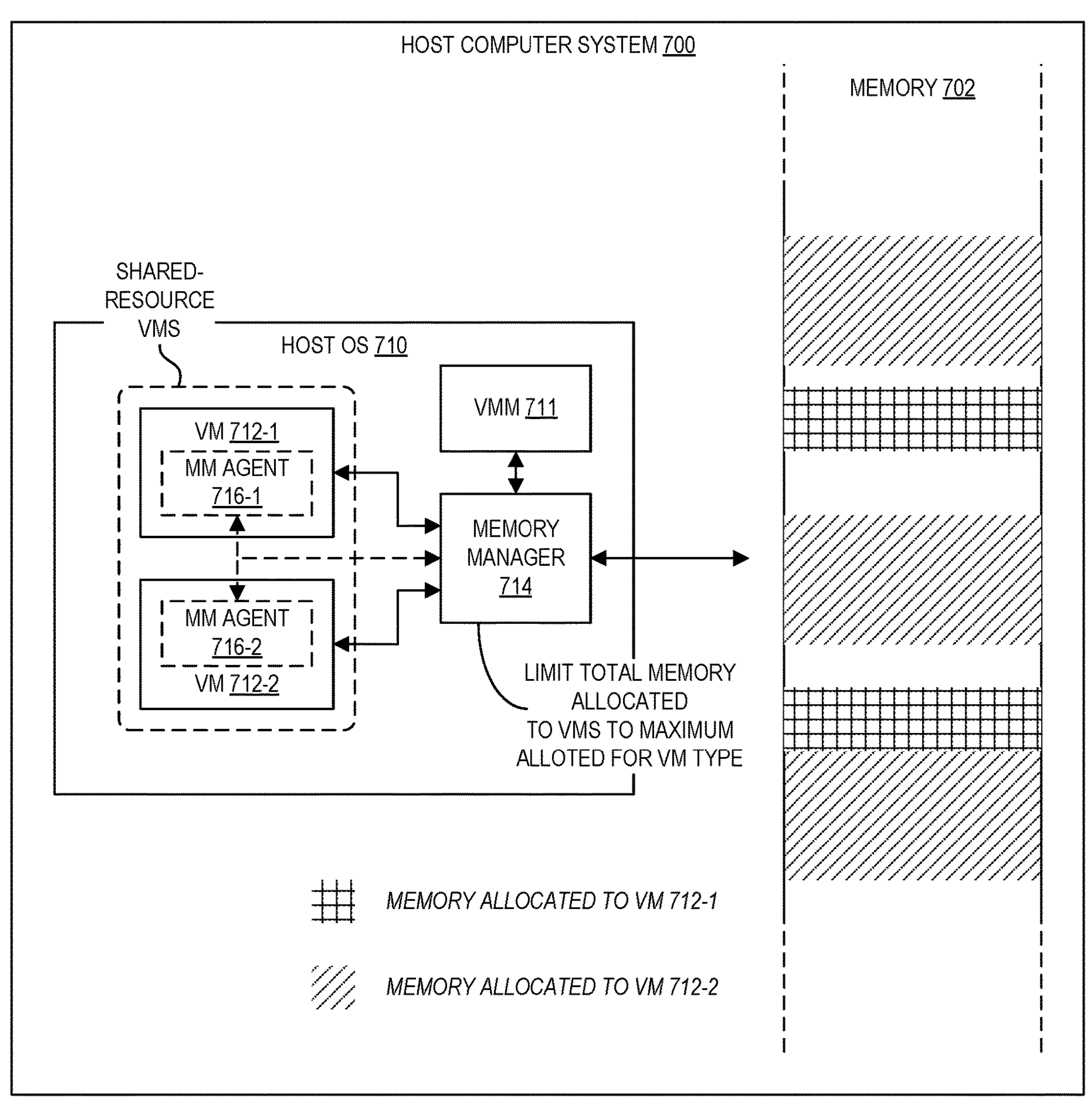
FIG. 7 illustrates an environment for sharing memory resources amongst resource-sharing virtual machines according to some examples.

FIGS. 6-8 illustrate various resource sharing techniques. Various techniques can be used to share resources amongst resource-sharing VMs and to limit resource usage of resource-sharing VMs according to their associated types. For example, Linux cgroups can be used to group the resource-sharing VM processes.

FIG. 6 illustrates an environment for sharing processing resources amongst resource-sharing virtual machines according to some examples. As illustrated, a host computer system 600 includes one or more processors 602 such as CPUs, graphics accelerators, or other devices. Processor 602 is a multi-core processor including cores 604. The host 600 executes a host operating system 610 including a VMM 611 and two resource-sharing VMs 612-1, 612-2. The associated type of the resource-sharing VMs may have an allocation of some amount of a processing resource. In this example, the VM type has a single core allocation. As a result, the pair of resource-sharing VMs share that single core.

Upon receiving a launch request from the hardware virtualization services 110 (e.g., circles (2), (5) of FIG. 1), the VMM 611 can link or otherwise associate the process associated with the launched VM(s) (e.g., whether one of the VMs 612 was launched with an existing VM 612 or both VMs 612 were launched as a pair) with the core 604-1. For example, the VMM 611 can configure a scheduler 614 of the host operating system 610 to share the core 604-1 between both VMs 612. The scheduler 614 can then divide compute time on the core 604-1 between the resource-sharing VMs 612.

FIG. 7 illustrates an environment for sharing memory resources amongst resource-sharing virtual machines according to some examples. As illustrated, a host computer system 700 includes memory 702, such as system memory. The host 700 executes a host operating system 710 including a VMM 711 and two resource-sharing VMs 712-1, 712-2. The associated type of the resource-sharing VMs may have an allocation of some amount of a memory to be shared (e.g., 8 GB).

Upon receiving a launch request from the hardware virtualization services 110 (e.g., circles (2), (5) of FIG. 1), the VMM 711 can configure a memory manager 714 of the host operating system 710 to limit the total allocation of memory to the resource-sharing VMs 712-1, 712-2 to the maximum limit.

In operation, the VM 712-1 can request and release memory allocations from host memory 702 via the memory manager 714 (memory allocations to VM 712-1 indicated with diagonal fill). Similarly, the VM 712-2 can request and release memory allocations from host memory 702 via the memory manager 714 (memory allocations to VM 712-2 indicated in hashed fill). The memory manager 714 can track the total memory allocated to the resource-sharing VMs—as additional memory is increased, the memory manager 714 increases the total allocation by the amount increased; as allocated memory is freed, the memory manager 714 decreases the total allocation by the amount decreased. If one of the resource-sharing VMs requests an allocation exceeds the difference between the maximum memory allotment of the virtual machine type and the current amount of memory allocated to the resource-sharing VMs, the memory manager 714 can return an insufficient or out of memory error.

In some examples, the memory manager 714 can have a communications channel to local memory manager agents 716 operating within the environments of VMs 712. The memory manager 714 can communicate with the agents 716 (e.g., processes within a guest operating system) to bias proportional share of the maximum memory allotment between the resource-sharing virtual machines. For example, when launching a resource-sharing virtual machine, the user can include in the request an indication of which virtual machine to treat as a primary or which virtual machine(s) to treat as secondary, and optionally a memory biasing factor.

The memory manager 714 can communicate with an agent 716 of a backup resource-sharing virtual machine to cause the agent to request an amount of memory predefined for a backup VM or based on the memory biasing factor within the associated VM environment. The agent, however, does not use the requested allocation, so the memory manager 714 does not need to allocate a corresponding amount of memory from the memory 702. Instead, the requested allocation reduces the amount of memory that other processes within the VM environment are able to access. For example, if both the resource-sharing VMs are configured with an 8 GB of memory (based on an associated instance type), the agent 716-1 in the VM environment of VM 712-1 can request 5 GB from the memory manager 714, resulting in the VM environment of VM 712-1 having 3 GB of remaining capacity. Since the agent does not use that allocation, it can be treated as "reserved" for the other VM environment of VM 712-2, establishing a 5 GB floor for VM 712-2.

In some examples, if the VMM 711 receives a request to launch a resource-sharing VM from the hardware virtualization services 110 with another VM that has already allocated the maximum allotment of memory for the virtual machine type (or if a base memory footprint of an additional VM plus the allotment to the existing VM would exceed the maximum), the VMM may reject the launch request.

FIGS. 8A-8D illustrates an environment for sharing networking resources amongst resource-sharing virtual machines 812-1 and 812-2 according to some examples. To provide isolation between virtual machines or groups of virtual machines, virtual machines communicate within a virtual network such as a VPC. A virtual network interface (VNI) attaches a virtual machine to a VPC. VNIs have an associated configuration that includes, for example, a network address on the VPC (e.g., an IP address).

As indicated at circle (1) in each of the examples of FIGS. 8A-8D, a network manager 814, typically a component of the host operating system or VMM, limits the aggregate network throughput of the resource-sharing VMs 812 to the associated throughput limit of a single instance of the VM type. For example, the network manager 814 can use a token bucket algorithm that fills a bucket associated with the resource-sharing VMs at a rate associated with the throughput limit of a single instance of the VM type. When sending traffic originating from any one of the resource-sharing VMs, the network manager 814 drains the token bucket relative to the amount of traffic sent. Thus, over time, if the two VMs 812 transmit over the network at a rate that exceeds the typical throughput of a single VM of the corresponding type, that throughput will be split between the VMs. Other techniques for limiting and sharing network capacity will be appreciated by those of skill in the art.

Figure 8A:
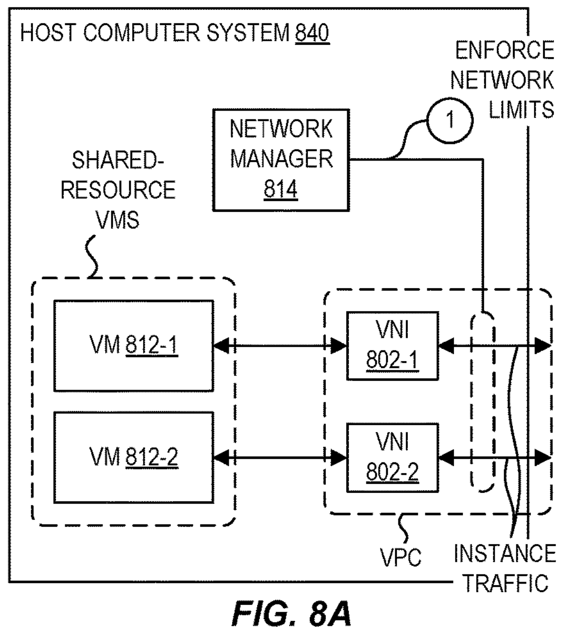
FIGS. 8A-8D illustrates environments for sharing networking resources amongst resource-sharing virtual machines according to some examples.

FIG. 8A illustrates an example in which a VNI is attached to each resource-sharing VMs. VM 812-1 is attached to VNI 802-1, and VM 812-2 is attached to VNI 802-2. As illustrated, both VNIs connect their respective VMs to the same VPC, although in other examples the VNIs may connect to different VPCs.

Figure 8B:
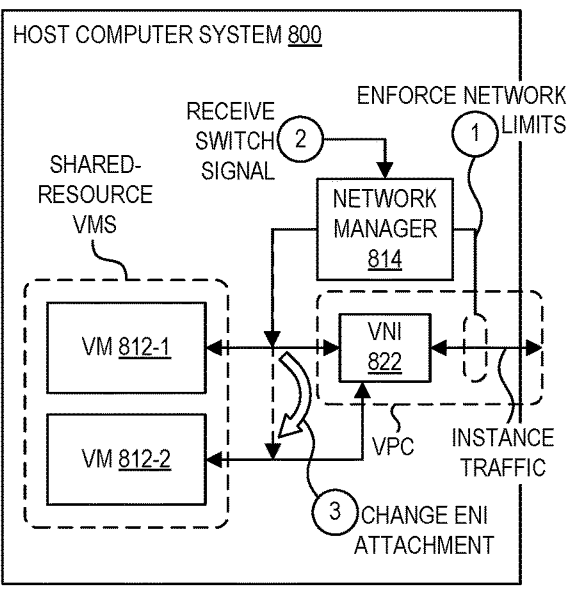

FIG. 8B illustrates a second example in which a VNI is detached from one of the resource-sharing VMs and attached to the other resource-sharing VM. Here, the network manager 814 has attached the VNI 822-1 to VM 812-1 (VM 812-2 may have another attached VNI (not shown)). Such an example can be used in the case of a backup resource-sharing VM. As indicated at circle (2), the network manager 814 receives a switch signal. The switch signal typically originates from an external entity such as another customer-owned application, the hardware virtualization service, a health monitoring service, etc., and may be routed through another local entity such as a VMM. Regardless of its origin, the switch signal changes a "backup" or "shadow" VM into the primary VM. In this example, the switch signal causes the network manager 814 to change the attachment of VNI 822 from VM 812-1 to 812-2, as indicated at circle (3). The configuration of VNI 822 remains unchanged, so VM 812-2 now appears to be VM 812-1 from the perspective of other entities on the VPC or that were previously communicating with VM 812-1 (e.g., the network address of VM 812-1 moves to VM 812-2 with the VNI).

Figure 8C:
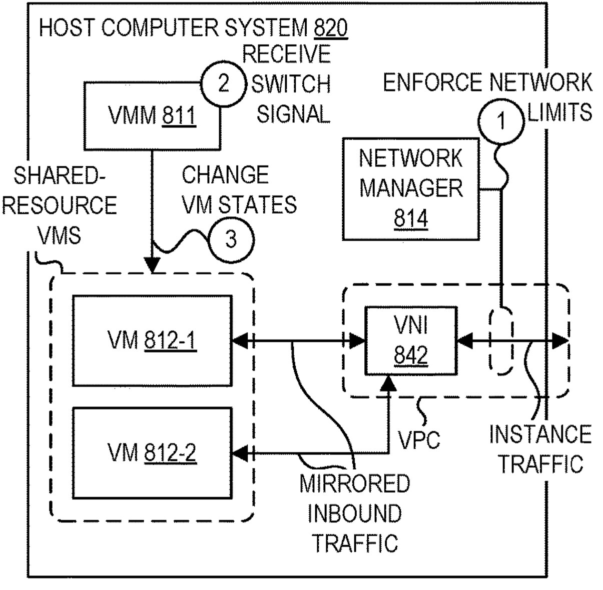

FIG. 8C illustrates a third example in which a VNI is attached to each resource-sharing VM where inbound traffic (from the VPC) is mirrored to the resource-sharing VMs. Again, such an example can be used in the case of a backup resource-sharing VM. Here, the network manager 814 has attached the VNI 842 to both VM 812-1 and VM 812-2, mirroring inbound traffic to each of the VMs 812 and packeting outbound traffic as appearing from the same origin. In this scenario, the backup VM is typically placed in an idle state (e.g., the process is paused) by the VMM 811. As indicated at circle (2), the VMM 811 receives a switch signal, causing the VMM 811 to change the process states of the VMs, as indicated at circle (3). In particular, the VMM 811 can resume the idle VM and pause the running VM.

Figure 8D:
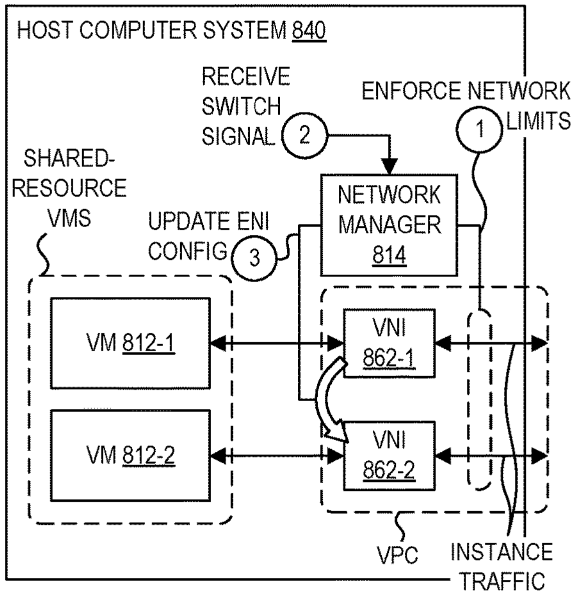

FIG. 8D illustrates a fourth example in which the resource-sharing VMs each have an attached VNI and the configuration (e.g., an IP address) of the VNI attached to a primary VM is switched to the configuration of the VNI attached to a backup VM. Here, the network manager 814 has attached the VNI 862-1 to VM 812-1 and VNI 862-2 to VM 812-2. Again, such an example can be used in the case of a backup resource-sharing VM. As indicated at circle (2), the network manager 814 receives a switch signal. In this example, the switch signal causes the network manager 814 to update the configuration of VNI 862-2 to match one or more configuration parameters of VNI 862-1, such as the network address. Additionally, the network manager 814 can change the configuration of VNI 862-1 (e.g., to change its network address). Based on the configuration update, VM 812-2 now appears to be VM 812-1 from the perspective of other entities on the VPC or that were previously communicating with VM 812-1 (e.g., the network address of VM 812-1 moves to VM 812-2 with the configuration change).

Figure 9:
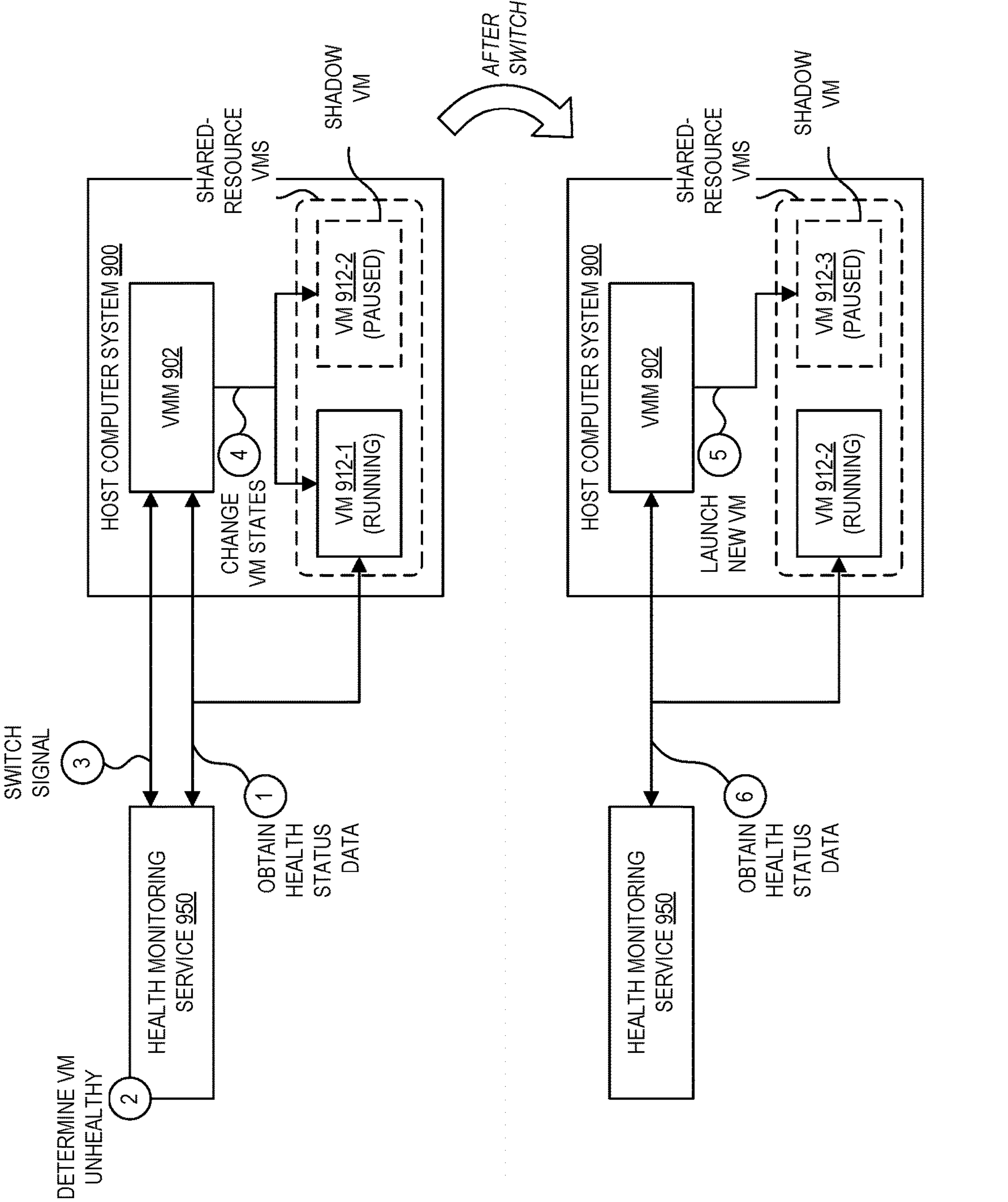
FIG. 9 illustrates an environment for health-based resource-sharing virtual machine replacement according to some examples.

FIG. 9 illustrates an environment for health-based resource-sharing virtual machine replacement according to some examples. In this example, a host computer system 900 hosts two resource-sharing VMs 912-1 and 912-2, typically launched from the same machine image. A VMM of the host computer system 900 has paused the VM 912-2 (the shadow or backup VM) while VM 912-1 remains active (the primary VM).

A health monitoring service 950 of the cloud provider network can monitor the status of VMs. To monitor the status of a VM, the health monitoring service 950 can perform one or more checks. Such checks can include environmental checks (e.g., querying the VMM of a host system for the state of a monitored VM), activity checks (e.g., pinging a monitored VM to determine whether it is responsive), and custom checks (e.g., executing custom code to interact with a monitored VM in a proscribed manner). For each check, the health monitoring service 950 can have one or more rules to determine whether the result of the check is indicative of an issue with the monitored VM.

The customer can request monitoring of a VM by the health monitoring service 950. A health monitoring request typically includes an identification of the VM to be monitored (whether via an instance identifier, a network address, etc.). In some examples, the request can also identify which checks to perform, including whether to perform any custom checks. If custom checks are requested, the customer can also provide or identify code to be used to perform the custom check(s).

As indicated at circle (1), the health monitoring service 950 can perform one or more checks on the health of VM 912-1. Such checks can include queries to the VMM 902 to check whether the VM 912-1 is unimpaired and to the VM 912-1 itself to check activity/perform custom checks. At some point, based on the check responses, the health monitoring service 950 determines that the VM 912-1 is no longer healthy, as indicated at circle (2). The health monitoring service 950 can send a switch signal to the VMM 902 to cause the failover to the backup VM 912-2. As indicated at circle (4), the VMM 902 can change the states of the VMs 912, including resuming execution of the VM 912-2 and pausing or terminating the VM 912-1. The failover can further include various network configuration changes such as illustrated and described with reference to FIG. 8.

Turning to the lower portion of FIG. 9, after the switch, the health monitoring service 950 can begin obtaining health status data from at least one of the VM 912-2 and the VMM 902 to monitor the health of the now primary VM 912-2. In some examples, the original launch requests (e.g., circles (1) and (4) of FIG. 1) can include a parameter that enables a persistent backup. In such cases, the hardware virtualization services 110 can set a corresponding parameter associated with the resource-sharing VMs in the VMM 902 to cause the VMM to launch a new backup (e.g., 912-3) as a resource-sharing virtual machine with the prior backup, now primary VM (e.g., VM 912-2), as indicated at circle (5). The VMM 902 can launch the new backup resource-sharing VM from the same machine image used to launch the prior backup resource-sharing VM.

Figure 10:
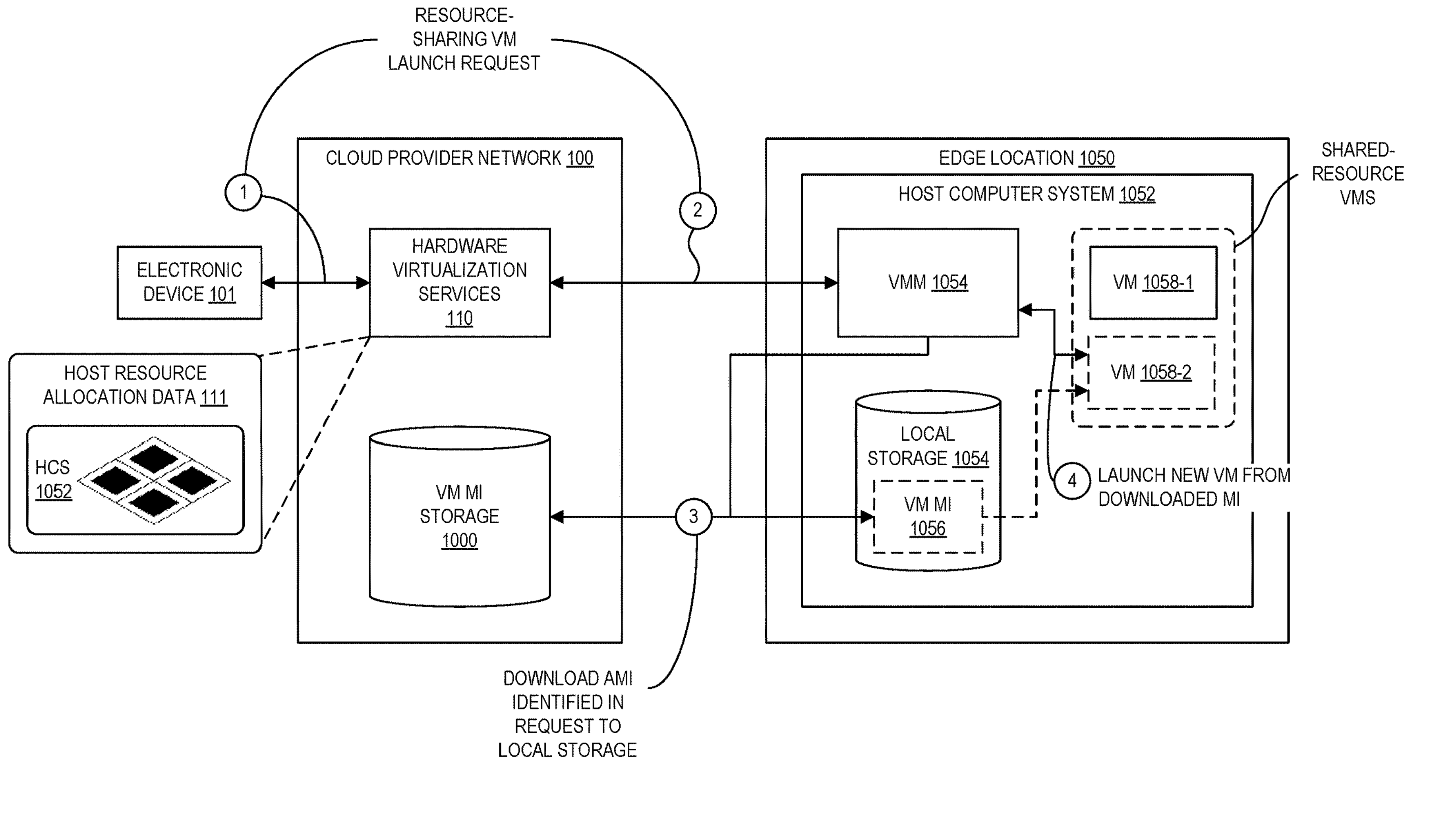
FIG. 10 illustrates an environment for transferring a virtual machine image according to some examples.

FIG. 10 illustrates an environment for transferring a virtual machine image according to some examples. Here, a host computer system 1052 hosts multiple VMs, including VM 1058-1. As indicated in host resource allocation data, the host computer system 1052 has no available slots. In such a scenario, a VMM 1054 of the host computer system would typically reject any additional launch requests. However, as indicated at circles (1) and (2), the hardware virtualization services 110 receives a request to launch a resource-sharing VM that includes an identification of the VM 1058-1. The hardware virtualization services 110 can identify host computer system 1052 as the target for the launch and send a request to launch the resource-sharing VM to the VMM 1054, the request including an identification of the machine image from which to launch the requested resource-sharing virtual machine. As indicated at circle (3), the VMM 1054 can retrieve the identified machine image 1056 from a VM machine image (MI) storage 1000 of the cloud provider network and store the machine image 1056 in local storage 1054. As indicated at circle (4), the VMM 1054 can launch the resource-sharing VM 1058-2 from the machine image 1056.

The scenario illustrated and described with reference to FIG. 10 can be used to facilitate rolling deployments, particularly at edge locations that may lack the free capacity to launch additional virtual machines. For example, the VM 1058-1 can remain executing while VMM 1054 launches VM 1058-2 with an updated version of the application. Thus, rather than terminate VM 1058-1 to free capacity for the launch of VM 1058-2, the time associated with the launch of VM 1058-2, including the time to transfer the machine image 1056, can elapse while VM 1058-1 remains active. Once the VMM 1054 has launched the VM 1058-2, the VMM 1054 can terminate the VM 1058-1.

FIG. 11 illustrates operations 1100 of a method for customer-initiated virtual machine resource allocation sharing according to some examples. Some or all of the operations 1100 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1100 are performed by at least one of the hardware virtualization service and/or a host computer system of the other figures.

The operations 1100 include, at block 1102, receiving, by a hardware virtualization service of a cloud provider network, a request to launch a first virtual machine, wherein the first virtual machine is of a first virtual machine type, the first virtual machine type having a resource amount allocated to virtual machines of the first virtual machine type. The operations 1100 further include, at block 1104, causing, by the hardware virtualization service, a launch of the first virtual machine on a host computer system of the cloud provider network. The operations 1100 further include, at block 1106, sharing, by the host computer system, an allocation of the resource amount from a corresponding resource of the host computer system between the first virtual machine and a second virtual machine, wherein the second virtual machine is of the first virtual machine type. Various other operations by one or more entities illustrated and described herein can be performed, including those set forth in the claims.

Figure 12:
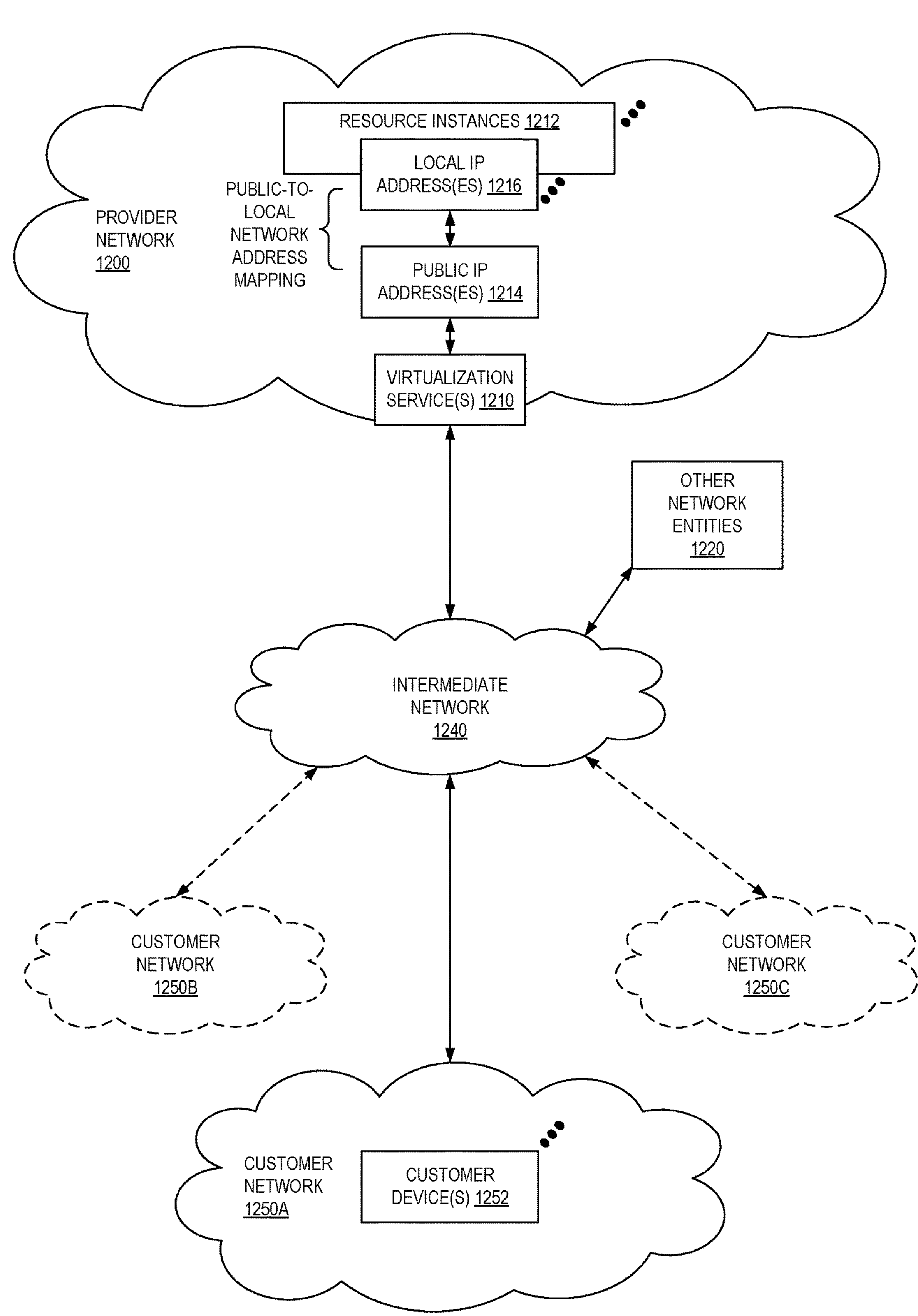
FIG. 12 illustrates an example provider network environment according to some examples.

FIG. 12 illustrates an example provider network environment according to some examples. A provider network 1200 can provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 can be associated with the resource instances 1212; the local IP addresses are the internal network addresses of the resource instances 1212 on the provider network 1200. In some examples, the provider network 1200 can also provide public IP addresses 1214 and/or public IP address ranges (e.g., Internet Protocol version 4 (IPv4) or Internet Protocol version 6 (IPv6) addresses) that customers can obtain from the provider 1200.

Conventionally, the provider network 1200, via the virtualization services 1210, can allow a customer of the service provider (e.g., a customer that operates one or more customer networks 1250A-1250C (or "client networks") including one or more customer device(s) 1252) to dynamically associate at least some public IP addresses 1214 assigned or allocated to the customer with particular resource instances 1212 assigned to the customer. The provider network 1200 can also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of the customer network(s) 1250A-1250C can, for example, implement customer-specific applications and present the customer's applications on an intermediate network 1240, such as the Internet. Other network entities 1220 on the intermediate network 1240 can then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 can be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1200; a customer can then assign their allocated public IP addresses to particular resource instances allocated to the customer. These public IP addresses can be referred to as customer public IP addresses, or simply customer IP addresses. Instead of being assigned by the provider network 1200 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
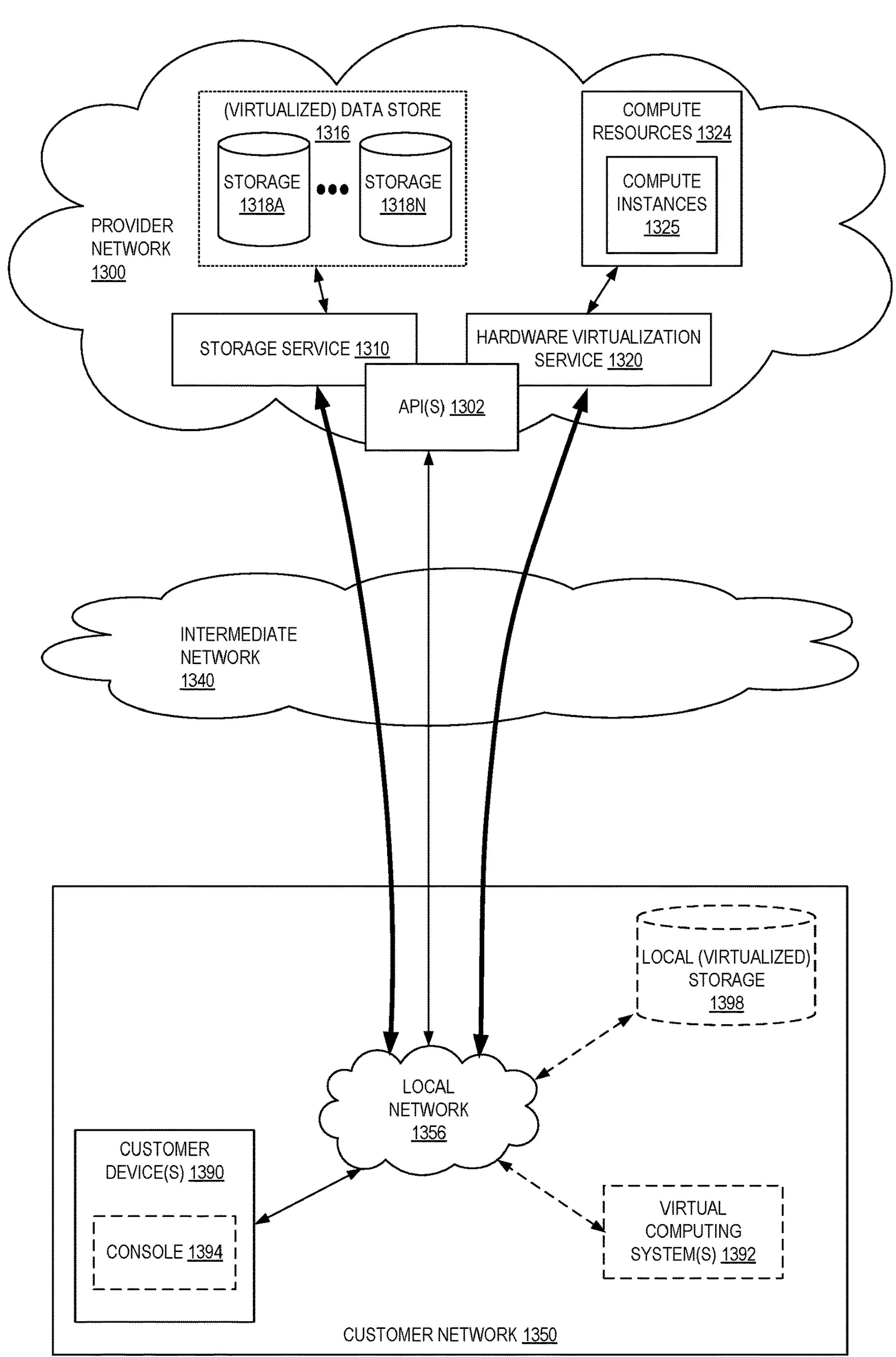
FIG. 13 illustrates an example provider network that provides a storage service and a hardware virtualization service to customers according to some examples.

FIG. 13 illustrates an example provider network that provides a storage service and a hardware virtualization service to customers according to some examples. A hardware virtualization service 1320 provides multiple compute resources 1324 (e.g., compute instances 1325, such as VMs) to customers. The compute resources 1324 can, for example, be provided as a service to customers of a provider network 1300 (e.g., to a customer that implements a customer network 1350). Each computation resource 1324 can be provided with one or more local IP addresses. The provider network 1300 can be configured to route packets from the local IP addresses of the compute resources 1324 to public Internet destinations, and from public Internet sources to the local IP addresses of the compute resources 1324.

The provider network 1300 can provide the customer network 1350, for example coupled to an intermediate network 1340 via a local network 1356, the ability to implement virtual computing systems 1392 via the hardware virtualization service 1320 coupled to the intermediate network 1340 and to the provider network 1300. In some examples, the hardware virtualization service 1320 can provide one or more APIs 1302, for example a web services interface, via which the customer network 1350 can access functionality provided by the hardware virtualization service 1320, for example via a console 1394 (e.g., a web-based application, standalone application, mobile application, etc.) of a customer device 1390. In some examples, at the provider network 1300, each virtual computing system 1392 at the customer network 1350 can correspond to a computation resource 1324 that is leased, rented, or otherwise provided to the customer network 1350.

From an instance of the virtual computing system(s) 1392 and/or another customer device 1390 (e.g., via console 1394), the customer can access the functionality of a storage service 1310, for example via the one or more APIs 1302, to access data from and store data to storage resources 1318A-1318N of a virtual data store 1316 (e.g., a folder or "bucket," a virtualized volume, a database, etc.) provided by the provider network 1300. In some examples, a virtualized data store gateway (not shown) can be provided at the customer network 1350 that can locally cache at least some data, for example frequently accessed or critical data, and that can communicate with the storage service 1310 via one or more communications channels to upload new or modified data from a local cache so that the primary store of data (the virtualized data store 1316) is maintained. In some examples, a user, via the virtual computing system 1392 and/or another customer device 1390, can mount and access virtual data store 1316 volumes via the storage service 1310 acting as a storage virtualization service, and these volumes can appear to the user as local (virtualized) storage 1398.

While not shown in FIG. 13, the virtualization service(s) can also be accessed from resource instances within the provider network 1300 via the API(s) 1302. For example, a customer, appliance service provider, or other entity can access a virtualization service from within a respective virtual network on the provider network 1300 via the API(s)

1302 to request allocation of one or more resource instances within the virtual network or within another virtual network.

Illustrative Systems

Figure 14:
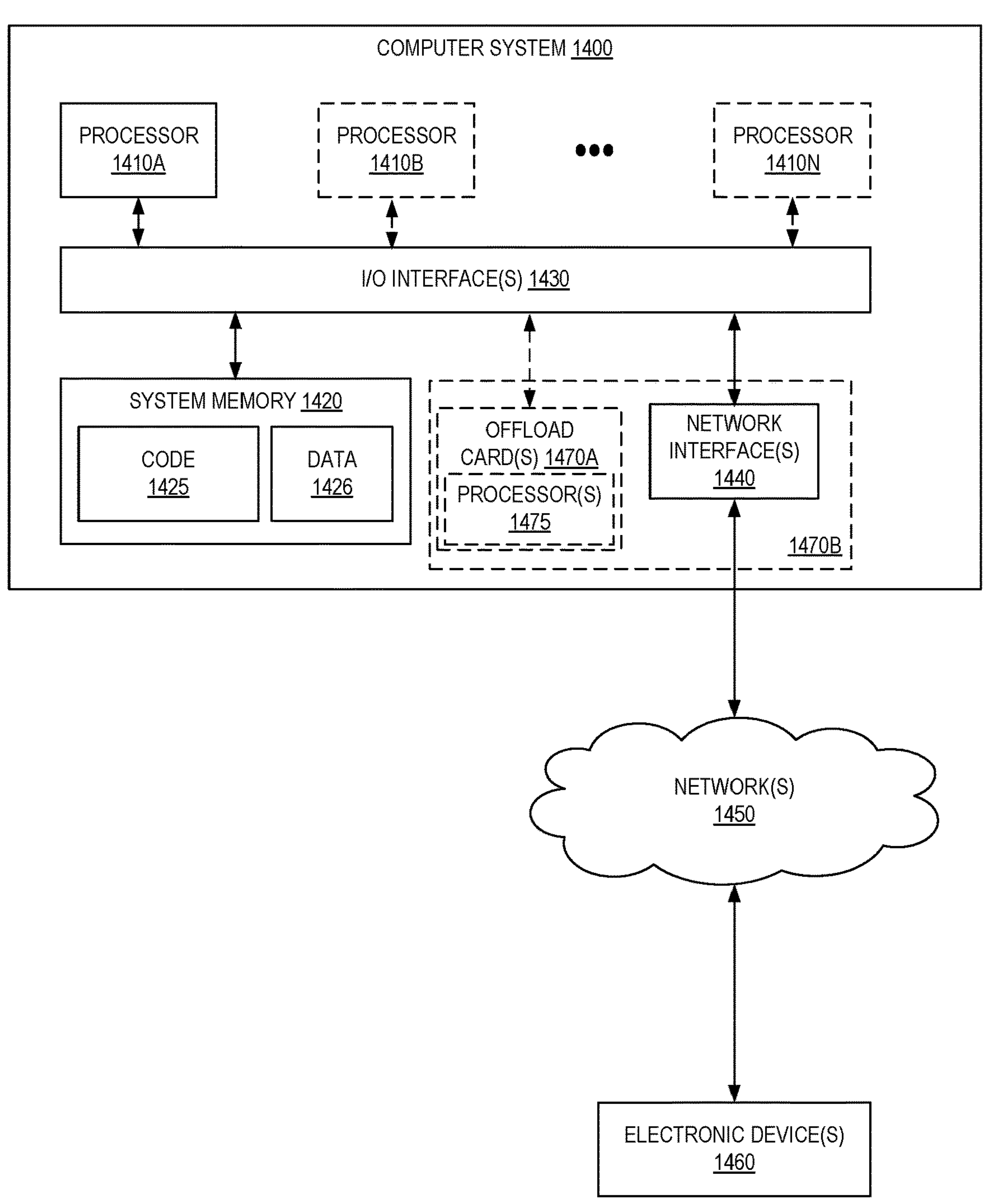
FIG. 14 illustrates an example computer system that can be used in some examples.

In some examples, a system that implements a portion or all of the techniques described herein can include a general-purpose computer system, such as the computer system 1400 illustrated in FIG. 14, that includes, or is configured to access, one or more computer-accessible media. In the illustrated example, the computer system 1400 includes one or more processors 1410 coupled to a system memory 1420 via an input/output (I/O) interface 1430. The computer system 1400 further includes a network interface 1440 coupled to the I/O interface 1430. While FIG. 14 shows the computer system 1400 as a single computing device, in various examples the computer system 1400 can include one computing device or any number of computing devices configured to work together as a single computer system 1400.

In various examples, the computer system 1400 can be a uniprocessor system including one processor 1410, or a multiprocessor system including several processors 1410 (e.g., two, four, eight, or another suitable number). The processor(s) 1410 can be any suitable processor(s) capable of executing instructions. For example, in various examples, the processor(s) 1410 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1410 can commonly, but not necessarily, implement the same ISA.

The system memory 1420 can store instructions and data accessible by the processor(s) 1410. In various examples, the system memory 1420 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1420 as code 1425 (e.g., executable to implement, in whole or in part, the hardware virtualizations services 110; an agent of a host computer system such as a VMM or hypervisor; agent components such as a scheduler, a memory manager, and a network manager; a health monitoring service; and other components depicted and described with reference to the above figures) and data 1426.

In some examples, the I/O interface 1430 can be configured to coordinate I/O traffic between the processor 1410, the system memory 1420, and any peripheral devices in the device, including the network interface 1440 and/or other peripheral interfaces (not shown). In some examples, the I/O interface 1430 can perform any necessary protocol, timing, or other data transformations to convert data signals from one component (e.g., the system memory 1420) into a format suitable for use by another component (e.g., the processor 1410). In some examples, the I/O interface 1430 can include support for devices attached through various types of peripheral buses, such as a variant of the Peripheral Component Interconnect (PCI) bus standard or the Universal Serial Bus (USB) standard, for example. In some examples, the function of the I/O interface 1430 can be split into two or more separate components, such as a north bridge and a south bridge, for example. Also, in some examples, some or all of the functionality of the I/O interface 1430, such as an interface to the system memory 1420, can be incorporated directly into the processor 1410.

The network interface 1440 can be configured to allow data to be exchanged between the computer system 1400 and other devices 1460 attached to a network or networks 1450, such as other computer systems or devices as illustrated in FIG. 1, for example. In various examples, the network interface 1440 can support communication via any suitable wired or wireless general data networks, such as types of Ethernet network, for example. Additionally, the network interface 1440 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1400 includes one or more offload cards 1470A or 1470B (including one or more processors 1475, and possibly including the one or more network interfaces 1440) that are connected using the I/O interface 1430 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 1400 can act as a host electronic device (e.g., operating as part of a hardware virtualization service) that hosts compute resources such as compute instances, and the one or more offload cards 1470A or 1470B execute a virtualization manager that can manage compute instances that execute on the host electronic device. As an example, in some examples the offload card(s) 1470A or 1470B can perform compute instance management operations, such as pausing and/or un-pausing compute instances, launching and/or terminating compute instances, performing memory transfer/copying operations, etc. These management operations can, in some examples, be performed by the offload card(s) 1470A or 1470B in coordination with a hypervisor (e.g., upon a request from a hypervisor) that is executed by the other processors 1410A-1410N of the computer system 1400. However, in some examples the virtualization manager implemented by the offload card(s) 1470A or 1470B can accommodate requests from other entities (e.g., from compute instances themselves), and cannot coordinate with (or service) any separate hypervisor.

In some examples, the system memory 1420 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1400 via the I/O interface 1430. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1400 as the system memory 1420 or another type of memory. Further, a computer-accessible medium can include transmission media or signals such as electrical, electromagnetic, or digital signals, conveyed via a communication medium such as a network and/or a wireless link, such as can be implemented via the network interface 1440.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1318A-1318N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

hosting a first virtual machine of a first virtual machine type on a host computer system of a cloud provider network, the first virtual machine type having a resource amount allocated to virtual machines of the first virtual machine type, wherein the host computer system comprises hardware resources divided into slots, each slot representing a discrete allocation of the hardware resources, and wherein the first virtual machine occupies a slot of the slots;

receiving, by a hardware virtualization service of the cloud provider network, a request from a customer of the cloud provider network, the request to launch a second virtual machine to share resources with the first virtual machine, the request including an identification of the first virtual machine;

determining an identification of the host computer system based at least in part on the identification of the first virtual machine;

causing, by the hardware virtualization service, an agent of the host computer system to launch the second virtual machine in a standby state on the host computer system, wherein the second virtual machine occupies the slot such that a portion of the hardware resources allocated to the slot and originally allocated to the first virtual machine is shared between the first virtual machine and the second virtual machine; and updating, by the hardware virtualization service, tracking data of the host computer system to associate the first virtual machine and the second virtual machine with the slot, wherein the slot is associated with the first virtual machine type.

2. The computer-implemented method of claim 1, wherein causing the agent of the host computer system to launch the second virtual machine on the host computer system comprises sending a launch request to the agent via a secure tunnel for control plane traffic, and wherein the host computer system is part of an edge location of the cloud provider network sited within a third-party network.

3. The computer-implemented method of claim 1, wherein the host computer system is a radio access network (RAN) edge server, and the first virtual machine executes a RAN network function.

4. A computer-implemented method comprising:

hosting a first virtual machine on a host computer system of a cloud provider network, wherein the host computer system comprises hardware resources divided into slots, each slot representing a discrete allocation of the hardware resources, and wherein the first virtual machine occupies a slot of the slots;

receiving, by a hardware virtualization service of the cloud provider network, a request to launch a second virtual machine;

causing, by the hardware virtualization service, a launch of the second virtual machine on the host computer system of the cloud provider network, wherein the second virtual machine occupies the slot such that a portion of the hardware resources allocated to the slot and originally allocated to the first virtual machine is shared between the first virtual machine and the second virtual machine, wherein the first virtual machine executes a primary application, and wherein the second virtual machine executes a backup application and is in a paused state;

detecting, by a health monitoring service of the cloud provider network, a failure of the primary application based at least in part on a metric obtained from at least one of the first virtual machine or an agent of the host computer system; and causing, by the health monitoring service, the second virtual machine to resume execution.

5. The computer-implemented method of claim 4, wherein the hardware virtualization service maintains tracking data to track virtual machines hosted on the host computer system, the tracking data for the host computer system including the slots, each slot of the slots associated with a virtual machine type, the method further comprising updating, by the hardware virtualization service, the tracking data with an indication that the slot is used by the first virtual machine and the second virtual machine.

6. The computer-implemented method of claim 4, wherein the portion of the hardware resources includes compute capacity, and wherein sharing the portion of the hardware resources between the first virtual machine and the second virtual machine comprises:

associating a first process with a first core of a multi-core processor of the host computer system, wherein the first process corresponds to the first virtual machine;

associating a second process with the first core, wherein the second process corresponds to the second virtual machine; and scheduling the first process and the second process on the first core of the multi-core processor.

7. The computer-implemented method of claim 4, wherein the portion of the hardware resources includes memory capacity, and wherein sharing the portion of the hardware resources between the first virtual machine and the second virtual machine comprises:

allocating a first amount of memory of the host computer system to a first process, wherein the first process corresponds to the first virtual machine;

allocating a second amount of memory of the host computer system to a second process, wherein the second process corresponds to the second virtual machine; and limiting a sum of the first amount of memory and the second amount of memory to the memory capacity.

8. The computer-implemented method of claim 4, wherein the portion of the hardware resources includes network throughput capacity, and wherein sharing the portion of the hardware resources between the first virtual machine and the second virtual machine comprises limiting a sum of a first amount of network traffic sent from the first virtual machine over a first period of time and a second amount of network traffic sent from the second virtual machine over the first period of time to the network throughput capacity.

9. The computer-implemented method of claim 8, wherein the first virtual machine is connected to the cloud provider network via a virtual network interface having a first internet protocol (IP) address, and wherein the second virtual machine is connected to the cloud provider network via the virtual network interface, the method further comprising sending traffic received at the virtual network interface to both the first virtual machine and the second virtual machine.

10. The computer-implemented method of claim 4, wherein the second virtual machine is executing an application on the host computer system prior to receiving the request, and wherein causing the launch of the second virtual machine on the host computer system of the cloud provider network comprises:

sending a second request to an agent of the host computer system, the request including an identification of a machine image from which to launch the second virtual machine, wherein the machine image includes an updated version of the application;

retrieving, by the agent, the machine image from a machine image data store of the cloud provider network; and launching, by the agent, the second virtual machine from the machine image on the host computer system of the cloud provider network.

11. The computer-implemented method of claim 10, further comprising causing, by the hardware virtualization service, a termination of the first virtual machine on the host computer system of the cloud provider network.

12. The computer-implemented method of claim 4, wherein the first virtual machine and the second virtual machine were launched from a machine image.

13. The computer-implemented method of claim 12, further comprising:

causing, by the hardware virtualization service, the first virtual machine to terminate; and causing, by the hardware virtualization service, a launch of a third virtual machine on the host computer system of the cloud provider network, wherein the third virtual machine is launched from the machine image in a paused state, wherein the third virtual machine occupies the slot such that the portion of the hardware resources is shared between the second virtual machine and the third virtual machine, and wherein the third virtual machine is of the first virtual machine type.

14. The computer-implemented method of claim 4, wherein the request to launch the second virtual machine includes an indication to place the second virtual machine in a paused state once launched.

15. A system comprising:

a first one or more electronic devices to implement a host computer system of a cloud provider network, the host computer system including host instructions that upon execution by one or more host processors cause the host computer system to:

host a first virtual machine, wherein the host computer system comprises hardware resources divided into slots, each slot representing a discrete allocation of the hardware resources, and wherein the first virtual machine occupies a slot of the slots;

a second one or more electronic devices to implement a hardware virtualization service of the cloud provider network, the hardware virtualization service including service instructions that upon execution by one or more service processors cause the hardware virtualization service to:

receive a request to launch a second virtual machine; and cause a launch of the second virtual machine on the host computer system of the cloud provider network, wherein the second virtual machine occupies the slot such that a portion of the hardware resources allocated to the slot and originally allocated to the first virtual machine is shared between the first virtual machine and the second virtual machine, wherein the first virtual machine executes a primary application, and wherein the second virtual machine executes a backup application and is in a paused state; and a third one or more electronic devices to implement a health monitoring service of the cloud provider network, the health monitoring service including instructions that upon execution by one or more processors cause the health monitoring service to:

detect a failure of the primary application based at least in part on a metric obtained from at least one of the first virtual machine or an agent of the host computer system; and cause the second virtual machine to resume execution.

16. The system of claim 15, wherein the hardware virtualization service includes further instructions that upon execution by the one or more service processors further cause the hardware virtualization service to:

maintain tracking data to track virtual machines hosted on the host computer system, the tracking data for the host computer system including the slots, each slot of the slots associated with a virtual machine type; and update the tracking data with an indication that the slot is used by the first virtual machine and the second virtual machine.

17. The system of claim 15, wherein the portion of the hardware resources includes compute capacity, and wherein the host computer system includes further instructions that upon execution by the one or more host processors further cause the host computer system to:

associate a first process with a first core of a multi-core processor of the host computer system, wherein the first process corresponds to the first virtual machine;

associate a second process with the first core, wherein the second process corresponds to the second virtual machine; and schedule the first process and the second process on the first core of the multi-core processor.

18. The system of claim 15, wherein the first virtual machine is executing an application on the host computer system prior to receiving the request, and wherein the hardware virtualization service includes further instructions that upon execution by the one or more service processors further cause the hardware virtualization service to:

send a second request to the host computer system, the second request including an identification of a machine image from which to launch the second virtual machine, wherein the machine image includes an updated version of the application; and wherein the host computer system includes further instructions that upon execution by the one or more host processors further cause the host computer system to:

retrieve the machine image from a machine image data store of the cloud provider network; and launch the second virtual machine from the machine image on the host computer system of the cloud provider network.

19. The system of claim 15, wherein the first virtual machine and the second virtual machine were launched from a machine image.

20. The system of claim 15, wherein the request to launch the second virtual machine includes an indication to place the second virtual machine in a paused state once launched.

* * * * *